(12) United States Patent
Mu et al.

(10) Patent No.: US 12,430,512 B2
(45) Date of Patent: Sep. 30, 2025

(54) ARTIFICIAL INTELLIGENCE-BASED NAMED ENTITY RECOGNITION METHOD AND APPARATUS, AND ELECTRONIC DEVICE

(71) Applicant: Tencent Technology (Shenzhen) Company Limited, Guangdong (CN)

(72) Inventors: Funan Mu, Guangdong (CN); Chenguang Wu, Guangdong (CN); Lifeng Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 430 days.

(21) Appl. No.: 17/685,283

(22) Filed: Mar. 2, 2022

(65) Prior Publication Data
US 2022/0188521 A1 Jun. 16, 2022

Related U.S. Application Data

(63) Continuation of application No. PCT/CN2020/127737, filed on Nov. 10, 2020.

(30) Foreign Application Priority Data
Feb. 28, 2020 (CN) .......................... 202010127101.0

(51) Int. Cl.
*G06F 40/295* (2020.01)
*G06F 40/166* (2020.01)
(Continued)

(52) U.S. Cl.
CPC .......... *G06F 40/295* (2020.01); *G06F 40/166* (2020.01); *G06N 3/044* (2023.01);
(Continued)

(58) Field of Classification Search
CPC ...... G06F 40/295; G06F 40/166; G06F 40/30; G06N 3/048; G06N 3/045; G06N 3/044
See application file for complete search history.

(56) References Cited

U.S. PATENT DOCUMENTS 9,087,297 B1 * 7/2015 Filippova ................ G06F 16/70
9,971,763 B2 * 5/2018 Abdel-Reheem ....... G06F 40/45
(Continued)

FOREIGN PATENT DOCUMENTS

CN 101075228 A 11/2007
CN 110232183 A 9/2008
(Continued)

OTHER PUBLICATIONS

International Search Report and Written Opinion issued Feb. 18, 2021 in international Application No. PCT/CN2020/127737 with English translation, 11 pgs.
(Continued)

*Primary Examiner* — Richemond Dorvil
*Assistant Examiner* — Ethan Daniel Kim
(74) *Attorney, Agent, or Firm* — ArentFox Schiff LLP

(57) ABSTRACT

Aspects of this disclosure are directed to an artificial intelligence (AI)-based named entity recognition (NER) method and apparatus, an electronic device, and a non-transitory computer-readable storage medium. The method can include performing, by an electronic device, vector transformation processing on text elements in a to-be-recognized text to obtain text representations of the text elements, and constructing a candidate entity phrase according to text elements that are in the to-be-recognized text and whose total quantity does not exceed an element quantity threshold. The method can further include performing integration processing on text representations corresponding to the text elements in the candidate entity phrase to obtain a text repre-
(Continued)

Abstract determining, object recommendation, text classification, question answering systems, ...

sentation of the candidate entity phrase, and performing classification processing on the text representation of the candidate entity phrase to determine a category to which the candidate entity phrase belongs in a non-named entity category and a plurality of named entity categories.

20 Claims, 9 Drawing Sheets

(51) Int. Cl.
    *G06F 40/30*    (2020.01)
    *G06N 3/044*   (2023.01)
    *G06N 3/045*   (2023.01)
    *G06N 3/048*   (2023.01)

(52) U.S. Cl.
    CPC .............. *G06N 3/045* (2023.01); *G06N 3/048* (2023.01); *G06F 40/30* (2020.01)

(56) References Cited

U.S. PATENT DOCUMENTS

| | | | | |
|---|---|---|---|---|
| 11,010,561 | B2* | 5/2021 | Bellegarda | G06F 40/30 |
| 2012/0117082 | A1* | 5/2012 | Koperda | G06F 16/24578 |
| | | | | 707/E17.084 |
| 2019/0108219 | A1* | 4/2019 | Barrett | G06F 40/30 |
| 2020/0035222 | A1* | 1/2020 | Sypniewski | G06N 3/044 |
| 2021/0176203 | A1* | 6/2021 | Nizar | H04L 51/08 |

FOREIGN PATENT DOCUMENTS

| | | |
|---|---|---|
| CN | ON 102179048 A | 8/2011 |
| CN | 103678569 A | 3/2014 |
| CN | ON 106547733 A | 3/2017 |
| CN | 108665492 A | 10/2018 |
| CN | 109101481 A | 12/2018 |
| CN | ON 109118562 A | 1/2019 |
| CN | 110033505 A | 7/2019 |
| CN | 110047121 A | 7/2019 |
| CN | 110502738 A | 11/2019 |
| CN | 110637326 A | 12/2019 |
| CN | 110668854 A | 1/2020 |
| CN | 110858409 A | 3/2020 |
| CN | 111353310 A | 6/2020 |
| CN | 110533752 A | 6/2025 |
| JP | 2019/197368 | 11/2019 |
| WO | WO 2020/027294 A1 | 2/2020 |

OTHER PUBLICATIONS

Chinese Office Action issued Sep. 29, 2020 in Chinese Application No. 202010142920.2 with English translation, 17 pgs.

* cited by examiner

```
┌─────────────────────────────────────────────────────────────┐
│ Perform vector transformation processing on text elements   │─ 101
│ in a to-be-recognized text, to obtain text representations  │
│ of the text elements                                        │
└─────────────────────────────────────────────────────────────┘
                            ▼
┌─────────────────────────────────────────────────────────────┐
│ Construct a candidate entity phrase according to text       │─ 102
│ elements that are in the to-be-recognized text and whose    │
│ total quantity does not exceed an element quantity threshold:│
│   ┌─────────────────────────────────────────────────────┐   │
│   │ Perform traversing processing on the text elements  │─ 201
│   │ in the to-be-recognized text                        │   │
│   └─────────────────────────────────────────────────────┘   │
│                           ▼                                 │
│   ┌─────────────────────────────────────────────────────┐   │
│   │ Perform, for a traversed text element, a scan cycle │─ 202
│   │ including a plurality times of scan processing, and │   │
│   │ combine the traversed text element and a text       │   │
│   │ element obtained through each scan processing into  │   │
│   │ a candidate entity phrase, a total quantity of text │   │
│   │ elements included in the candidate entity phrase    │   │
│   │ being not exceeding the element quantity threshold  │   │
│   └─────────────────────────────────────────────────────┘   │
└─────────────────────────────────────────────────────────────┘
                            ▼
┌─────────────────────────────────────────────────────────────┐
│ Perform integration processing on text representations      │─ 103
│ corresponding to the text elements in the candidate entity  │
│ phrase, to obtain a text representation of the candidate    │
│ entity phrase:                                              │
│   ┌─────────────────────────────────────────────────────┐   │
│   │ Sequentially perform cyclic update processing on    │─ 203
│   │ the text representations of the plurality of text   │   │
│   │ elements in the candidate entity phrase in an order │   │
│   │ from the first text element to the last text element│   │
│   │ in the to-be-recognized text, to obtain a text      │   │
│   │ representation update result of each text element   │   │
│   │ in the candidate entity phrase                      │   │
│   └─────────────────────────────────────────────────────┘   │
│                           ▼                                 │
│   ┌─────────────────────────────────────────────────────┐   │
│   │ Use a text representation update result of the last │─ 204
│   │ text element in the candidate entity phrase as the  │   │
│   │ text representation of the candidate entity phrase  │   │
│   └─────────────────────────────────────────────────────┘   │
└─────────────────────────────────────────────────────────────┘
                            ▼
┌─────────────────────────────────────────────────────────────┐
│ Perform classification processing on the text representation│─ 104
│ of the candidate entity phrase, to determine a category to  │
│ which the candidate entity phrase belongs in a non-named    │
│ entity category and a plurality of named entity categories  │
└─────────────────────────────────────────────────────────────┘
```

FIG. 4B

ARTIFICIAL INTELLIGENCE-BASED NAMED ENTITY RECOGNITION METHOD AND APPARATUS, AND ELECTRONIC DEVICE

RELATED APPLICATION

This application is a continuation of International Application No. PCT/CN2020/127737, filed on Nov. 10, 2022, which claims priority to Chinese Patent Application No. 202010127101.0 filed on Feb. 28, 2020. The entire disclosures of the prior applications are hereby incorporated by reference in their entirety.

FIELD OF THE TECHNOLOGY

This application relates to the field of artificial intelligence (AI) technologies, including an AI-based named entity recognition (NER) method and apparatus, an electronic device, and a non-transitory computer-readable storage medium.

BACKGROUND OF THE DISCLOSURE

AI is a theory, a method, a technology, and an application system that use a digital computer or a machine controlled by a digital computer to simulate, extend, and expand human intelligence, perceive an environment, obtain knowledge, and obtain an optimal result with knowledge. Natural language processing (NLP) is an important direction of AI, which mainly studies various theories and methods that can implement effective communication between humans and computers in natural languages.

Additionally, named entity recognition (NER) is an important research branch of NLP, which aims to locate a named entity in a text and classify the named entity into a predefined category. The named entity is, for example, a person, an organization, a location, or a quantity. In some cases, a part of a named entity may also be a named entity, that is, it is multi-nested. Therefore, there is a need to recognize the multi-nested named entity.

SUMMARY

Aspects of this disclosure are directed to an artificial intelligence (AI)-based named entity recognition (NER) method. The method can include performing vector transformation processing on text elements in a to-be-recognized text to obtain text representations of the text elements, and constructing a candidate entity phrase according to text elements that are in the to-be-recognized text, where a total quantity of the candidate entity phrase is less than an element quantity threshold. The method can further include performing, by processing circuitry, integration processing on text representations corresponding to the text elements in the candidate entity phrase to obtain a text representation of the candidate entity phrase, and performing classification processing on the text representation of the candidate entity phrase to determine a category to which the candidate entity phrase belongs in a non-named entity category and a plurality of named entity categories.

In further embodiments, constructing a candidate entity phrase can further include performing traversing processing on the text elements in the to-be-recognized text, and performing a scan cycle that includes a plurality of times of scan processing of a traversed text element, determining a scan quantity that synchronously increases or decreases based on a quantity of the times that scan processing has been performed in the scan cycle, and performing scan processing starting from the traversed text element based on the scan quantity, and combining the traversed text element and a text element obtained through the scan processing into a candidate entity phrase until the scan quantity that is initially zero increases to a scan quantity threshold, or the scan quantity that is initially the scan quantity threshold decreases to zero. The scan quantity threshold is a result obtained by subtracting one from the element quantity threshold.

Other embodiments of the disclosure can provide an artificial intelligence (AI)-based named entity recognition (NER) apparatus. The apparatus can include a vector transformation device that is configured to perform vector transformation processing on text elements in a to-be-recognized text to obtain text representations of the text elements, and a construction device that is configured to construct a candidate entity phrase based on text elements that are in the to-be-recognized text and having a total quantity less than an element quantity threshold. The apparatus can further include an integration device that is configured to perform integration processing on text representations corresponding to the text elements in the candidate entity phrase to obtain a text representation of the candidate entity phrase, and a classification device that is configured to perform classification processing on the text representation of the candidate entity phrase to determine a category to which the candidate entity phrase belongs in a non-named entity category and a plurality of named entity categories.

Further embodiments of the disclosure can provide a non-transitory computer-readable storage medium storing instructions that, when executed by a processor, cause a processor to implement operations including performing vector transformation processing on text elements in a to-be-recognized text to obtain text representations of the text elements, constructing a candidate entity phrase according to text elements that are in the to-be-recognized text, where a total quantity of the candidate entity phrase is less than an element quantity threshold, performing integration processing on text representations corresponding to the text elements in the candidate entity phrase to obtain a text representation of the candidate entity phrase, and performing classification processing on the text representation of the candidate entity phrase to determine a category to which the candidate entity phrase belongs in a non-named entity category and a plurality of named entity categories.

BRIEF DESCRIPTION OF THE DRAWINGS

Various exemplary embodiments of this disclosure that are proposed as examples will be described in detail with reference to the following figures, wherein like numerals reference like elements, and wherein:

FIGS. 4A-D are schematic diagrams of procedures of an AI-based NER method according to exemplary embodiments of this disclosure.

DESCRIPTION OF EMBODIMENTS

Figure 1:
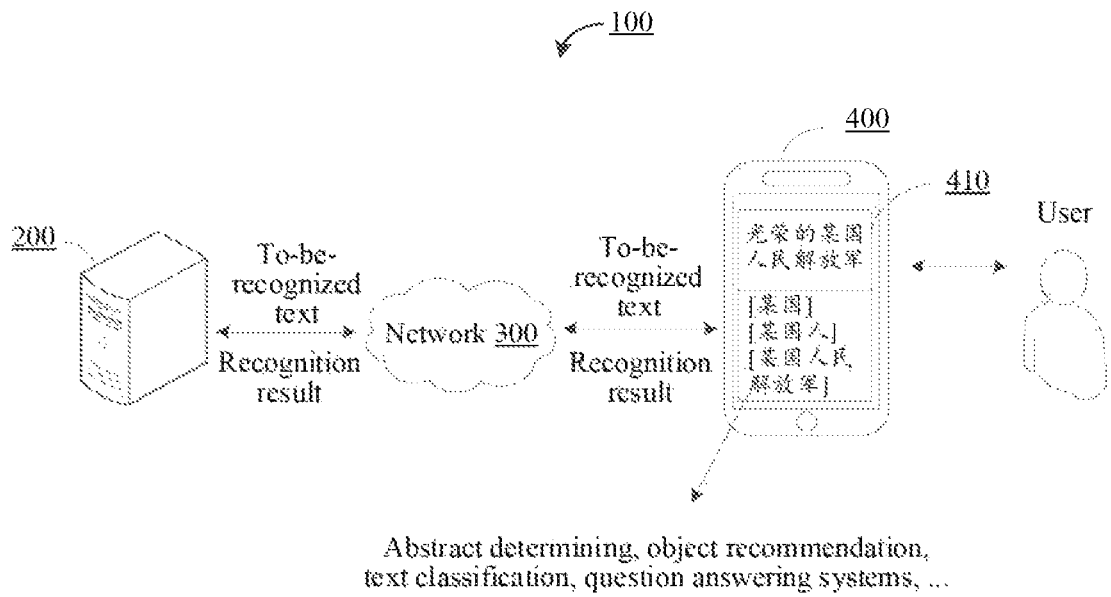
FIG. 1 is a schematic diagram of an architecture an AI-based NER system according to an exemplary embodiment of this disclosure.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

Further, in the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein. In the following description, the term "plurality of" means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the exemplary embodiments of this application are applicable to the following explanations.

(1) Natural language processing (NLP): It is an important direction of AI, which studies language problems in communication between humans and communication between humans and computers. NLP mainly develops a model that indicates linguistic competence and linguistic performance, builds a computing framework to implement such a language model, proposes a corresponding method to continuously improve such a language model, designs various practical systems according to such a language model, and discusses an evaluation technology for these practical systems.

(2) Convolutional neural network (CNN) model: It is a feedforward neural network model. Artificial neurons can respond to surrounding units. The CNN model usually includes a convolutional layer and a pooling layer.

(3) Recurrent neural network (RNN) model: It is a neural network model used for processing sequence data. An internal state of such a model can show dynamic timing behavior, and an internal memory can be used to process variable-length input sequences. In the exemplary embodiments of this application, cyclic update processing may be implemented by using the RNN model.

(4) Named entity: It is an entity with a specific meaning in a text. The named entity may have different categories and regulations depending on different actual application scenarios. For example, the named entity may include a person, an organization, a location, a time expression, a quantity, a currency value, and a percentage.

(5) Multi-category named entity: It is a named entity that belong to a plurality of named entity categories.

6) Multi-nested named entity: A named entity is multi-nested if a part of the named entity is also a named entity. For example, in a text "光荣的某国人民解放军", "某国人民解放军" is a named entity of an "army" category, and "某国" nested in the named entity "某国人民解放军" is a named entity of a "country" category.

(7) Sequence tagging: It is usually a process of adding a tag in a tag set to each element in a linear input sequence.

(8) Named entity recognition (NER): It aims to locate a named entity in a text and classify the named entity into a predefined category, such as a person, an organization, or a location. In the exemplary embodiments of this application, an NER result may be applied to application scenarios, such as information extraction, a question answering system, syntactic analysis, and machine translation.

(9) Nested NER: Conventional NER can only roughly recognize a text of a flat structure from a text. Unlike the conventional NER, a nested NER task is executed to recognize a multi-category named entity and a multi-nested named entity from a text.

(10) Text representation: Characters are high-level cognitive abstract entities produced in a process of human cognition. In NLP, the characters need to be transformed into a data type that can be processed by a computer, that is, transformed into a text representation in a vector form.

(11) Text element: In the exemplary embodiments of this disclosure, the text element may be a word or a phrase, that is, a quantity of words included in the text element is not limited.

The related art mainly provides a nested NE BILOU encoding and decoding solution to implement the nested NER task. The solution is mainly performing sequence tagging on tokens, and performing encoding and decoding processing based on a sequence-to-sequence model structure. In an encoding process, a tagging and encoding manner similar to BILOU is used. To adapt to multi-nested and multi-category cases, the solution allows multi-layer token tagging. In a decoding process, to deal with multi-layer tags obtained through encoding, the solution processes these multi-layer tagging results by formulating a rule, such as nearest matching. For example, the following encoding example table is provided:

| In | O |
| the | B-ORG |
| US | I-ORG\|U-GPE |
| Federal | I-ORG |

| | |
|---|---|
| District | I-ORG\|U-GPE |
| Court | I-ORG |
| of | I-ORG |
| New | I-ORG\|B-GPE |
| Mexico | I-ORG\|L-GPE |
| . | O |

In the above, "B" indicates a start location of a named entity, "I" indicates the middle of a named entity, "L" indicates an end of a named entity, "O" indicates not belonging to a named entity, "U" indicates a separate named entity, "ORG" indicates an organization, and "GPE" indicates a geopolitical entity. However, the solution requires a decoding rule to be formulated according to tag content of data. As a result, it is difficult to design and implement a decoding rule for a relatively large quantity of named entity categories. In the nested NER task, efficiency and flexibility of NER are poor.

The exemplary embodiments of this disclosure can provide an AI-based NER method and apparatus, an electronic device, and a computer-readable storage medium, which can improve efficiency and precision of NER.

The following describes an exemplary application of the electronic device provided in the embodiments of this disclosure. The electronic device provided in the embodiments of this disclosure may be a server, such as a server deployed in a cloud, which provides a user with a remote NER function according to an obtained to-be-recognized text; or may be a terminal device, such as a question answering device, which expands a knowledge graph according to a named entity obtained through NER, and implements intelligent question answering according to the knowledge graph; or may even be a handheld terminal or other devices.

FIG. 1 is a schematic diagram of an optional architecture of an AI-based NER system 100 according to an exemplary embodiment of this disclosure. To support an AI-based NER application, a terminal device 400 is connected to a server 200 by using a network 300. The network 300 may be a wide area network or a local area network, or a combination of the two.

In some embodiments, for example, the electronic device is a terminal device, and the AI-based NER method provided in the embodiments of this application may be implemented by the terminal device. For example, the terminal device 400 obtains a to-be-recognized text that is entered by a user or automatically selected, and determines text representations of text elements in the to-be-recognized text. Then, the terminal device 400 constructs a plurality of candidate entity phrases based on the text elements in the to-be-recognized text according to an element quantity threshold that is set, For each obtained candidate entity phrase, the terminal device 400 can perform integration processing on text representations corresponding to text elements in the candidate entity phrase, and perform classification processing on an obtained text representation of the candidate entity phrase, to obtain a category to which the candidate entity phrase belongs.

In some embodiments, for example, the electronic device is a server, and the AI-based NER method provided in the embodiments of this application may alternatively be implemented by the server. For example, the server 200 obtains a to-be-recognized text from a database, and constructs a plurality of candidate entity phrases according to an element quantity threshold that is set. For each candidate entity phrase, the server 200 can perform classification processing on a text representation of the candidate entity phrase, to obtain a category to which the candidate entity phrase belongs.

In some embodiments, the AI-based NER method provided in the embodiments of this disclosure may alternatively be implemented by the terminal device and the server in cooperation. For example, the server 200 obtains a to-be-recognized text sent by the terminal device 400, and sends, to the terminal device 400 after a series of processing, a recognized candidate entity phrase belonging to a named entity category, to inform the user of the terminal device 400. That is, the server 200 is configured to execute a nested NER task, and the terminal device 400 is configured to collect a processed object (that is, the to-be-recognized text) of the nested NER task, and present a result of executing the nested NER task.

The terminal device 400 may display various results, for example, a candidate entity phrase belonging to a named entity category, in an NER process in a graphical interface 410. Using a to-be-recognized text "光荣的某国人民解放军" as an example, FIG. 1 shows candidate entity phrases in the to-be-recognized text that belong to named entity categories, including "某国", "某国人", and "某国人民解放军". The NER result may be applied to various application scenarios of the NLP field, such as scenarios of abstract determining, object recommendation, text classification, and a question answering system shown in FIG. 1, and scenarios of information extraction, grammatical analysis, and machine translation. Exemplary applications of named entities are described below.

In some embodiments, the terminal device may run a computer program to implement the AI-based NER method provided in the embodiments of this disclosure. For example, the computer program may be a native program or a software module in an operating system; may be a local application (APP), that is, a program that needs to be installed in the operating system to run; may be an applet, that is, a program that only needs to be downloaded to a browser environment to run; or may be a mini program that can be embedded in any APP. When executed, the computer program may cause one or more processors to implement the AI-based NER method. In short, the computer program may be in any form, such as an APP, a module, or a plug-in.

Additionally, the exemplary embodiments of this disclosure may be implemented with the help of a cloud technology. The cloud technology is a hosting technology of aggregating hardware, software, network, and other resources in a wide area network or a local area network to implement computing, storage, processing, and sharing of data. In another sense, the cloud technology is also a general term for a network technology, an information technology, an integration technology, a management platform technology, an application technology, and the like that are applied based on a cloud computing business mode. A resource pool may be formed and used on demand, which is flexible and convenient. A cloud computing technology will become an important support. A background service of a technical network system requires a lot of computing and storage resources.

In some embodiments, the servers may be independent physical servers, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform, for example, the cloud service may be a named entity recognition service for the terminal device to invoke. The terminal device may be, but is not limited to, a smartphone, a tablet computer, a notebook computer, a desktop computer, a smart watch, a smart TV, and the like. The terminal device and the server may be directly or indirectly connected in a wired or wireless communication manner. This is not limited in this embodiment of this application.

Figure 2:
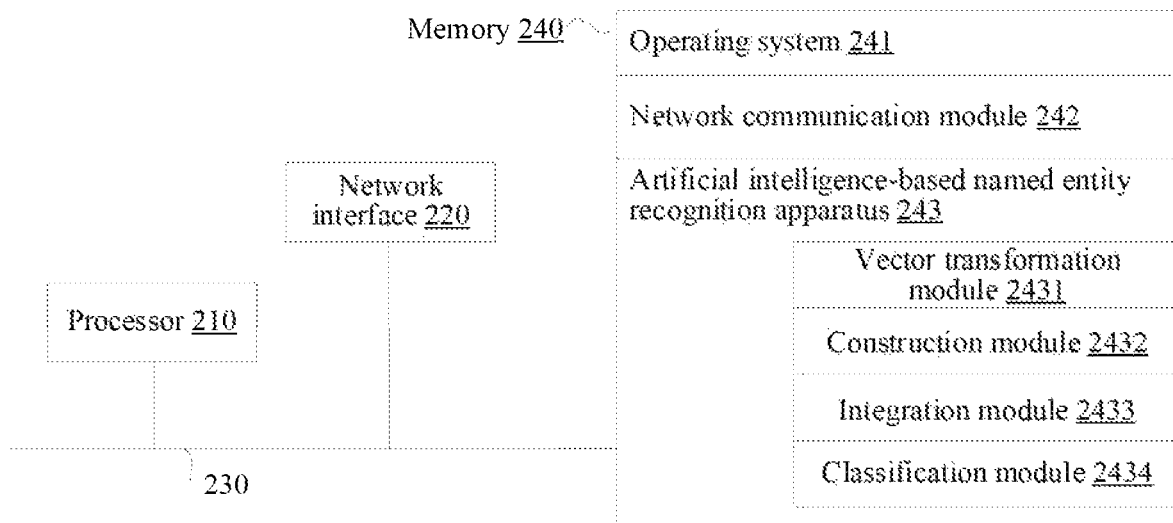
FIG. 2 is a schematic diagram of an architecture of a server according to an exemplary embodiment of this disclosure.

The following description is provided by using an example in which the electronic device is a server. FIG. 2 is a schematic diagram of an architecture of a server 200 (which may be, for example, the server 200 shown in FIG. 1) according to an exemplary embodiment of this disclosure. The server 200 shown in FIG. 2 can include at least one processor 210, a memory 240, and at least one network interface 220. The components in the server 200 are coupled by using a bus system 230. It may be understood that the bus system 230 is configured to implement connection and communication between these components. In addition to a data bus, the bus system 230 further includes a power bus, a control bus, and a status signal bus. However, for the purpose of clear description, all buses are marked as the bus system 230 in FIG. 2.

The memory 240 may be a removable memory, a non-removable memory, or a combination thereof. Exemplary hardware devices include a solid-state memory, a hard disk drive, an optical disc driver, or the like. Optionally, the memory 240 includes one or more storage devices that are physically remote from the processor 210.

The memory 240 can include a volatile memory or a non-volatile memory, or may include both a volatile memory and a non-volatile memory. The non-volatile memory may be a read-only memory (ROM), and the volatile memory may be a random access memory (RAM). The memory 240 described in the embodiments of this application is to include any other suitable type of memories.

In some embodiments, when the electronic device is a terminal device, based on the structure shown in FIG. 2, a user interface may be further included. The user interface may include one or more output apparatuses that enable presentation of media content, including one or more speakers and/or one or more visual display screens. The user interface may further include one or more input apparatuses, including user interface components that facilitate user inputs, such as a keyboard, a mouse, a microphone, a touchscreen, a camera, and other input buttons and controls.

In some embodiments, the memory 240 may store data to support various operations. Examples of the data include programs, modules, and data structures, or a subset or a superset thereof. The descriptions are made below by using examples.

An operating system 241 includes a system program configured to process various basic system services and perform a hardware-related task, for example, a framework layer, a core library layer, and a driver layer, and is configured to implement various basic services and process a hardware-related task.

A network communication module 242 is configured to reach other computing devices via one or more (wired or wireless) network interfaces 220. Exemplary network interfaces 220 include Bluetooth, Wi-Fi, universal serial bus (USB), and other interfaces.

In some embodiments, when the electronic device is a terminal device, the memory 240 may further include a presentation module and an input processing module. The presentation module is configured to enable presentation of information via one or more output apparatuses (for example, a display screen and a speaker) associated with a user interface (for example, a user interface configured to operate a peripheral device and display content and information). The input processing module is configured to detect one or more user inputs or interactions from one or more input apparatuses and translate the detected inputs or interactions. Of course, it should be understood that one or more of the modules described in any of the exemplary embodiments of this disclosure can be implemented by processing circuitry, for example.

In some embodiments, the AI-based NER method provided in the embodiments of this application may be implemented by software. FIG. 2 shows an AI-based NER apparatus 243 stored in the memory 240, which may be software in a form such as a program or a plug-in, and includes the following software modules: a vector transformation module 2431, a construction module 2432, an integration module 2433, and a classification module 2434. These modules are logical, and therefore may be combined in any manner or further split according to a function to be implemented. Functions of the modules are described below.

The following describes, with reference to the above-described exemplary application and structure of the electronic device, a process in which the electronic device implements the AI-based NER method by using the embedded AI-based NER apparatus.

Figure 3:
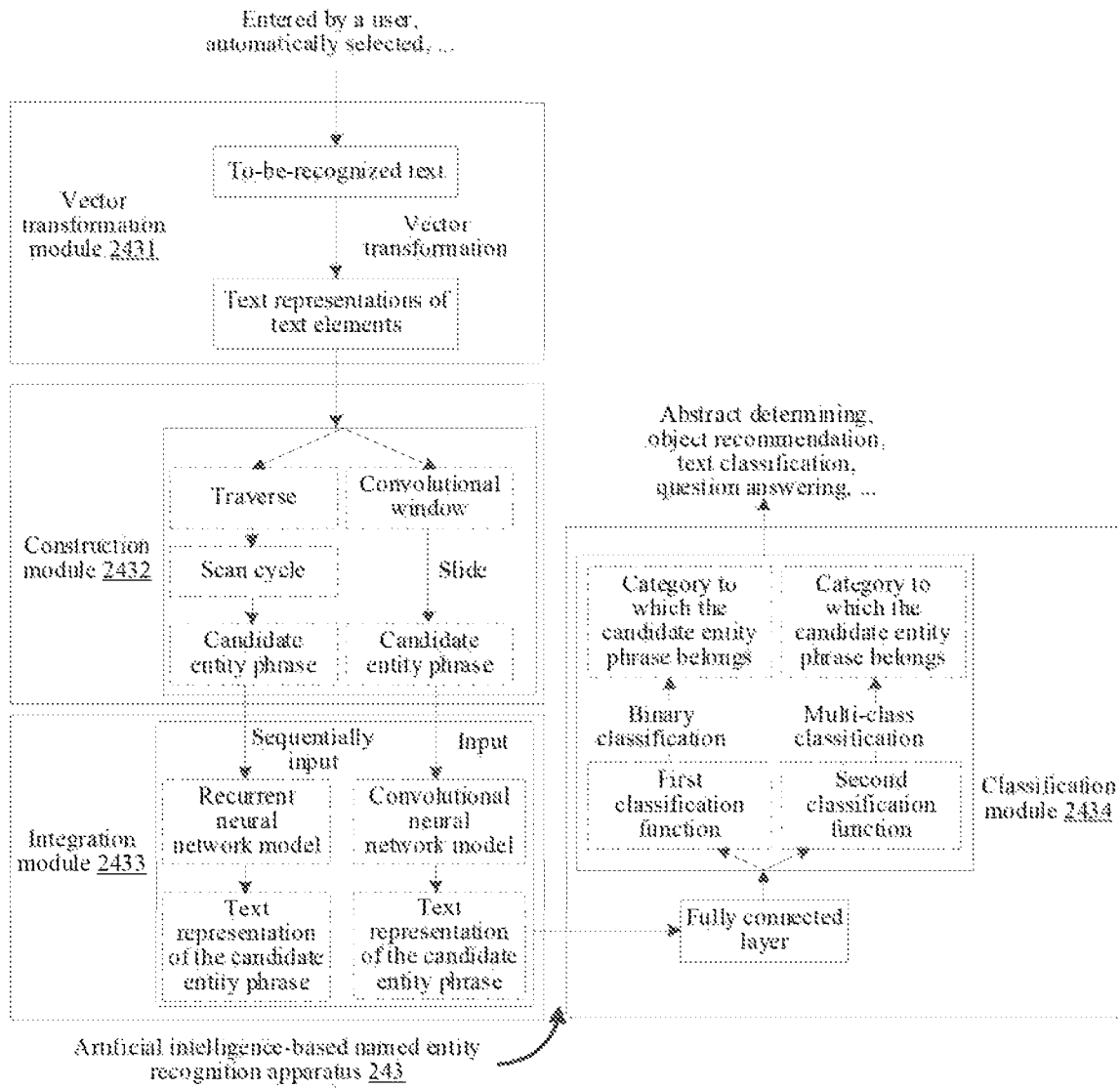
FIG. 3 is a schematic diagram of an architecture of an AI-based NER apparatus according to an exemplary embodiment of this disclosure.
Figure 4A:
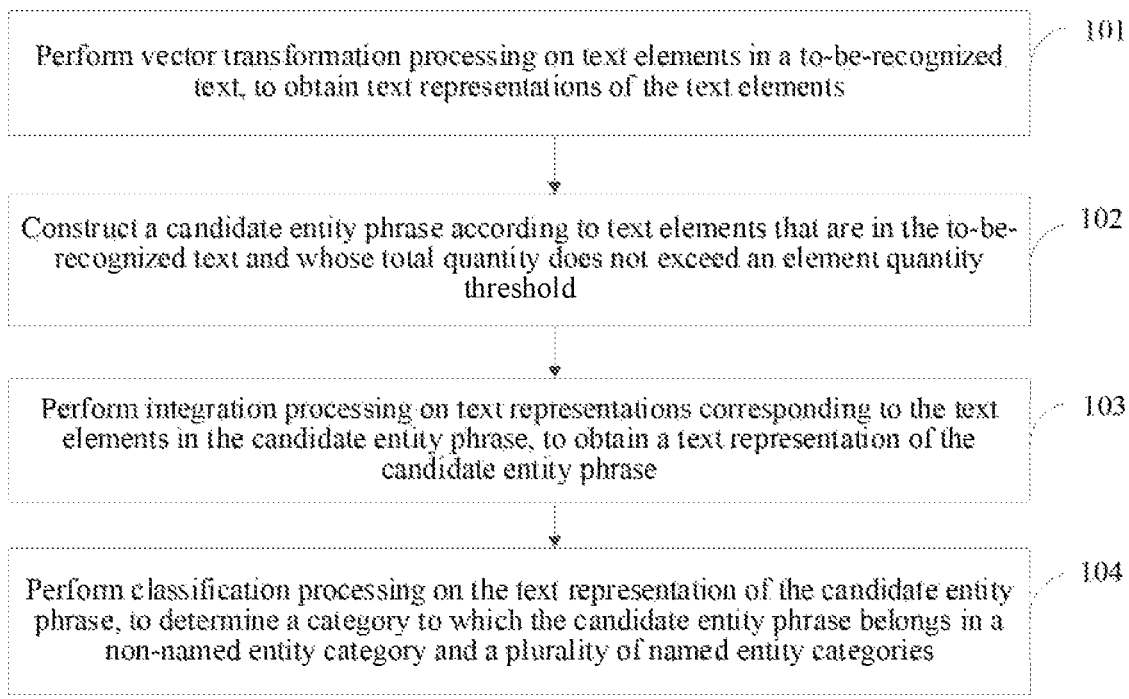

FIG. 3 is a schematic diagram of an architecture of an AI-based NER apparatus 243 according to an embodiment of this application, which shows a procedure of implementing NER by using a series of modules. FIG. 4A is a schematic diagram of a procedure of an AI-based NER method according to an embodiment of this application. Steps shown in FIG. 4A are described with reference to FIG. 3.

In Step 101 vector transformation processing can be performed on text elements in a to-be-recognized text, to obtain text representations of the text elements. For example, referring to FIG. 3, in a vector transformation module 2431, a to-be-recognized text is obtained. The to-be-recognized text may be entered by a user, for example, in a manner such as voice or handwriting, or may be automatically selected, for example, the electronic device may use a locally stored text as a to-be-recognized text. Then, a plurality of text elements in the to-be-recognized text are determined. A type of the text element may be a word or a phrase. For each text element in the to-be-recognized text, vector transformation processing, that is, embedding processing, is performed on the text element to map the text element to a vector space, to obtain a text representation in a vector form for subsequent processing.

In some embodiments, before step 101, the method can further include performing either of the following operations, to obtain the text elements in the to-be-recognized text: using each word in the to-be-recognized text as a text element; and performing word segmentation processing on the to-be-recognized text, and using a phrase obtained through the word segmentation processing as a text element.

For different types of text elements, the embodiments of this disclosure provide different determining manners. When a type of a text element that needs to be determined is a word, each word in the to-be-recognized text may be used as a text element. A quantity of text elements determined in this manner is relatively large, a subsequent computation amount is relatively large, and precision of NER is relatively high.

When the type of the text element that needs to be determined is a phrase, word segmentation processing may be performed on the to-be-recognized text, and each phrase obtained through the word segmentation processing may be used as a text element. The word segmentation processing may be implemented by using a language technology platform (LTP) tool or another tool, which is not limited. A quantity of text elements obtained in this manner is relatively small, a subsequent computation amount is relatively small, and efficiency of NER is relatively high. Either of the two manners may be selected according to a requirement in an actual application scenario.

When the type of the text element that needs to be determined is a phrase, segmentation processing may be first performed on the to-be-recognized text, for example, segmentation is performed by using punctuation marks (such as commas and periods) in the to-be-recognized text as segmentation locations, to obtain a plurality of sentences in the to-be-recognized text, and then word segmentation processing is performed on each sentence, to determine text elements in each sentence. The foregoing segmentation processing manner is applicable to a case that a to-be-recognized text includes a plurality of sentences.

In Step 102, a candidate entity phrase can be constructed according to text elements that are in the to-be-recognized text and whose total quantity does not exceed an element quantity threshold. For example, all candidate entity phrases that may occur in the to-be-recognized text may be determined in an exhaustive manner. A total quantity of text elements included in each candidate entity phrase does not exceed the element quantity threshold. This is applicable to a case of a multi-nested named entity. Each obtained candidate entity phrase is a part of the to-be-recognized text. For example, the to-be-recognized text is "光荣的某国人 民解放军", and an obtained candidate entity phrase "某国人民解放军" is a part of the to-be-recognized text.

The element quantity threshold may be manually set, for example, to 7. Alternatively, a named entity including most text elements in a database may be obtained, and a quantity of the text elements included in the named entity is determined as the element quantity threshold.

In Step 103, integration processing can be performed on text representations corresponding to the text elements in the candidate entity phrase, to obtain a text representation of the candidate entity phrase.

After Step 102, a plurality of candidate entity phrases may be obtained. For each candidate entity phrase, integration processing is performed on text representations corresponding to text elements in the candidate entity phrase, to obtain a text representation of the candidate entity phrase. An integration processing manner is not limited in the embodiments of this application, for example, may be weighting processing (such as weighted summation), which is determined according to a manner of constructing the candidate entity phrase.

In Step 104, classification processing can be performed on the text representation of the candidate entity phrase, to determine a category to which the candidate entity phrase belongs in a non-named entity category and a plurality of named entity categories.

The text representation of the candidate entity phrase can accurately and effectively indicate a semantic meaning of the candidate entity phrase. Therefore, classification processing may be performed on the text representation of the candidate entity phrase, to obtain the category to which the candidate entity phrase belongs. For example, fully connected processing may be performed on the text representation of the candidate entity phrase, then a text representation obtained after the fully connected processing is mapped to a probability of corresponding to the non-named entity category and probabilities of respectively corresponding to the plurality of named entity categories, and the category to which the candidate entity phrase belongs is determined according to these probabilities. In the embodiments of this application, a non-named entity is also used as a category, which is treated the same as a named entity category.

After the category to which the candidate entity phrase belongs is obtained, a candidate entity phrase belonging to a named entity category (which means belonging to any named entity category) in the to-be-recognized text may be applied to NLP application scenarios, including but not limited to, application scenarios of abstract determining, object recommendation, text classification, and question answering shown in FIG. 3.

In some embodiments, after Step 104, the method can further include performing segmentation processing on the to-be-recognized text to obtain a plurality of sentences; determining, as an abstract keyword, a candidate entity phrase that belongs to any named entity category and whose occurrence frequency meets a frequency condition; determining a score of the sentence according to a quantity of abstract keywords included in the sentence; and determining a sentence whose score meets a score condition as a text abstract of the to-be-recognized text.

In the embodiments of this application, the text abstract of the to-be-recognized text may be determined according to an NER result. For example, the to-be-recognized text may be a thesis, news, or a review article, which is not limited. First, segmentation processing is performed on the to-be-recognized text, for example, segmentation is performed by using punctuation marks (such as commas and periods) in the to-be-recognized text as segmentation locations, to obtain a plurality of sentences in the to-be-recognized text. Certainly, the segmentation processing operation may alternatively be performed before Step 101, which is not limited in the embodiments of this application.

For ease of distinguishing, a candidate entity phrase belonging to any named entity category in the to-be-recognized text is named as a keyword, and an occurrence frequency of the keyword in the to-be-recognized text is determined. When an occurrence frequency of a keyword meets the frequency condition, the keyword is determined as an abstract keyword. For example, K keywords with the highest occurrence frequency are determined as abstract keywords, K being an integer greater than 0. Certainly, a keyword corresponding to an occurrence frequency exceeding a frequency threshold may alternatively be determined as an abstract keyword. The frequency threshold may be set according to an actual application scenario.

For each sentence included in the to-be-recognized text, a quantity of abstract keywords included in the sentence is determined, and a score of the sentence is determined according to the quantity. For example, the quantity of abstract keywords included in the sentence may be directly used as the score of the sentence. Alternatively, the quantity of abstract keywords included in the sentence may be divided by a total quantity of text elements included in the sentence, to obtain the score of the sentence. Finally, a sentence whose score meets the score condition is determined as the text abstract of the to-be-recognized text. For example, L sentences with the highest score may be determined as the text abstract of the to-be-recognized text, L being an integer greater than 0. Alternatively, a sentence whose score exceeds a score threshold may be determined as the text abstract of the to-be-recognized text. In the foregoing manner, accuracy of abstract determining is improved, and the determined text abstract can better indicate an overall semantic meaning of the to-be-recognized text.

In some embodiments, after Step 104, the method can further include determining, in a case that the to-be-recognized text is used for indicating a to-be-recommended object, a candidate entity phrase belonging to any named entity category as a keyword of the to-be-recommended object; obtaining a user portrait keyword, and determining a keyword coincidence degree between the user portrait keyword and the keyword of the to-be-recommended object; and performing an operation of recommending the to-be-recommended object in a case that the keyword coincidence degree exceeds a first coincidence degree threshold.

Herein, the to-be-recognized text is used for indicating a to-be-recommended object. A type of the to-be-recommended object is not limited in the embodiments of this application. For example, the to-be-recommended object may be a product, and the to-be-recognized text is a product description of the product. Alternatively, the to-be-recommended object may be a movie, and the to-be-recognized text is a summary description of the movie.

Targeted intelligent object recommendation may be implemented according to an NER result of the to-be-recognized text. For example, a candidate entity phrase belonging to any named entity category in the to-be-recognized text is determined as a keyword of the to-be-recommended object. In addition, a user portrait keyword is obtained. For example, user portrait keywords of all registered users in an APP are obtained. Then, a keyword coincidence degree between a user portrait keyword of each user and the keyword of the to-be-recommended object is determined. The user portrait keyword may be set by the user, or may be obtained by collecting keyword statistics on historical browsing records of the user.

When the keyword coincidence degree is determined, an intersection set and a union set between the user portrait keyword and the keyword of the to-be-recommended object may be determined, and a first quantity of keywords included in the intersection set is divided by a second quantity of keywords included in the union set, to obtain the keyword coincidence degree. For example, the to-be-recognized text is a descriptive text of a movie, and keywords in the to-be-recognized text include "love", "literary", and "story", while user portrait keywords include "love", "science fiction", and "comedy." In this case, an obtain keyword coincidence degree is ⅕.

For the keyword coincidence degree, whether recommendation is performed is determined by setting the first coincidence degree threshold. For example, when a keyword coincidence degree between a user portrait keyword of a user and the keyword of the to-be-recommended object exceeds the first coincidence degree threshold (such as 80%), the operation of recommending the to-be-recommended object to the user is performed. A specific recommendation manner is not limited in the embodiments of this application, for example, may be email recommendation, SMS message recommendation, or foreground pop-up window recommendation. In the foregoing manner, a recommended object is more in line with a user portrait, that is, in line with user interest, accuracy of recommendation is improved, and actual utilization of computing resources consumed by the electronic device to perform the recommendation is improved.

In some embodiments, after Step 104, the method can further include determining a candidate entity phrase belonging to any named entity category as a keyword; determining a keyword coincidence degree between a first to-be-recognized text and a second to-be-recognized text; and classifying the first to-be-recognized text and the second to-be-recognized text into the same text class in a case that the keyword coincidence degree exceeds a second coincidence degree threshold.

An NER result may also be applied to an application scenario of text classification. For example, a candidate entity phrase belonging to any named entity category in the to-be-recognized text is determined as a keyword, and a keyword coincidence degree between a first to-be-recognized text and a second to-be-recognized text is determined. Herein, when the keyword coincidence degree is calculated, the foregoing manner may also be used, to determine an intersection set and a union set between a keyword of the first to-be-recognized text and a keyword of the second to-be-recognized text, and a quantity of keywords included in the intersection set is divided by a quantity of keywords included in the union set, to obtain the keyword coincidence degree between the first to-be-recognized text and the second to-be-recognized text.

In the application scenario of text classification, the second coincidence degree threshold is further set. When the keyword coincidence degree exceeds the second coincidence degree threshold (such as 80%), it indicates that the first to-be-recognized text and the second to-be-recognized text are relatively similar, and the first to-be-recognized text and the second to-be-recognized text are classified into the same text class. The texts classified into the same text class may be used for similar text recommendation. For example, when a query target of a text query request is the first to-be-recognized text, the first to-be-recognized text and the second to-be-recognized text that belongs to the same text class as the first to-be-recognized text are returned in response to the text query request. In the foregoing manner, a keyword coincidence degree is used as a similarity between texts for text classification, so that accuracy of classification is improved, and classified texts may be used for similar text recommendation, that is, texts belonging to the same text class are together recommended to a user, so that user experience can be effectively improved.

In some embodiments, after Step 104, the method can further include adding a candidate entity phrase belonging to any named entity category to a knowledge graph, the knowledge graph being used for responding to a category query request for a candidate entity phrase belonging to any named entity category.

An NER result may be used for new word discovery. For example, a candidate entity phrase belonging to any named entity category in the to-be-recognized text is determined as a keyword, and the keyword and the category to which the keyword belongs are together added to a knowledge graph. In this way, the knowledge graph may be used to respond to a category query request for a candidate entity phrase belonging to a named entity category. For example, a candidate entity phrase added to the knowledge graph is "某国", and a category to which the candidate entity phrase belongs is a named entity category "country". When a category query request including "某国" is received, the knowledge graph may be queried to respond, that is, reply, to the category query request according to the "country" category obtained through the query. In the foregoing manner, effective expansion and continuous growth of named entities in a knowledge graph can be achieved, and accuracy of replying according to the knowledge graph can be improved.

In some embodiments, after Step 104, the method can further include determining a candidate entity phrase belonging to any named entity category as a keyword; performing syntactic analysis processing on the to-be-recognized text, to obtain a subject keyword, a relative word, and an object keyword in the to-be-recognized text, the relative word being used for indicating a relationship between the subject keyword and the object keyword; and constructing a triplet according to the subject keyword, the relative word, and the object keyword, and adding the triplet to a knowledge graph, the knowledge graph being used for responding to an object query request including the subject keyword and the relative word.

In the embodiments of this application, a relationship between keywords may be further added to a knowledge graph. For example, syntactic analysis processing is performed on the to-be-recognized text based on recognized keywords. For example, syntactic analysis processing may be performed by using an LTP tool or another tool, to obtain a subject keyword, a relative word, and an object keyword in the to-be-recognized text, the relative word being used for indicating a relationship between the subject keyword and the object keyword. For example, the to-be-recognized text is "张三向李四借钱", and keywords include "张三" and "李四". In this case, through syntactic analysis processing, the following may be obtained: a subject keyword is "张三", a relative word is "借钱", and an object keyword is "李四".

A subject-predication-object (SPO) triplet is constructed according to the obtained subject keyword, relative word, and object keyword, and the SPO triplet is added to the knowledge graph as a piece of knowledge in the knowledge graph. The knowledge graph may be used for responding to an object query request including the subject keyword and the relative word. For example, when the object query request is used for querying for an object from which Zhang San borrows money, the knowledge graph may be queried, and a reply is made according to a result "李四". In the foregoing manner, effective expansion of relationships between named entities is achieved, and an expanded knowledge graph can be used for more accurate question answering.

As shown in FIG. 4A, in the embodiments of this disclosure, a candidate entity phrase in which a total quantity of included text elements does not exceed an element quantity threshold is constructed, which can effectively deal with a case of a multi-nested named entity, and greatly improve efficiency and flexibility of NER.

In some exemplary embodiments, FIG. 4B shows a schematic diagram of an optional procedure of an AI-based NER method according to an embodiment of this disclosure. Step 102 shown in FIG. 4A may be implemented by performing step 201 and step 202, and is described in combination with the steps.

In Step 201, traversing processing can be performed on the text elements in the to-be-recognized text. For example, referring to FIG. 3, in a construction module 2432, a candidate entity phrase may be obtained through traversing processing and a scan cycle. First, traversing processing is performed on the text elements in the to-be-recognized text. A traversing processing order is not limited in the embodiments of this application. For example, the traversing processing order may be an order from the first text element to the last text element in the to-be-recognized text, or may be an order from the last text element to the first text element in the to-be-recognized text.

In Step 202, for a traversed text element, a scan cycle including a plurality times of scan processing can be performed, and combine the traversed text element and a text element obtained through each scan processing into a candidate entity phrase, a total quantity of text elements included in the candidate entity phrase being not exceeding the element quantity threshold.

Herein, a scan cycle is performed for a traversed text element, and the scan cycle includes a plurality times of scan processing. When each scan processing is completed, the traversed text element and a text element obtained through the scan processing are combined into a candidate entity phrase. In this way, for each scan processing, a candidate entity phrase can be obtained. A total quantity of text elements included in the candidate entity phrase does not exceed the element quantity threshold.

In some embodiments, the performing a scan cycle including a plurality times of scan processing may be implemented by determining, according to a quantity of times of scan processing that have been performed in the scan cycle, a scan quantity that synchronously increases or decreases, and performing, according to the scan quantity, scan processing starting from the traversed text element, and combining the traversed text element and a text element obtained through the scan processing into a candidate entity phrase, until the scan quantity that is initially zero increases to a scan quantity threshold, or the scan quantity that is initially the scan quantity threshold decreases to zero; the scan quantity threshold being a result obtained by subtracting one from the element quantity threshold.

For ease of understanding, the following separately describes two exemplary cases in detail. In a first case, the scan quantity is initially 0, and the scan quantity synchronously increases with the quantity of times of scan processing that have been performed in the scan cycle. For example, every time the quantity of times of scan processing that have been performed increases by one, the scan quantity is correspondingly added with 1. An example in which the to-be-recognized text is "光荣的某国人民解放军" and the element quantity threshold is 7 is used for description. If the traversed text element is "光" (that is, a type of a text element is a word), in the first scan of the scan cycle, the quantity of times of scan processing that have been performed is 0, the scan quantity is 0, and scan processing starting from "光" is performed according to the scan quantity. Because a text element obtained through the scan processing is null, "光" is used as a candidate entity phrase. In the second scan of the scan cycle, the quantity of times of scan processing that have been performed is 1, the scan quantity is 1, scan processing starting from "光" is performed according to the scan quantity and "荣" is obtained, "光" and "荣" are combined into "光荣", and "光荣" is used as a candidate entity phrase, and so on, until the scan quantity is equal to 6.

In a second case, the scan quantity is initially the scan quantity threshold, and the scan quantity synchronously decreases with the quantity of times of scan processing that have been performed in the scan cycle. For example, every time the quantity of times of scan processing that have been performed increases by one, the scan quantity is correspondingly subtracted by 1. An example in which the to-be-recognized text is "光荣的某国 人民解放军" and the element quantity threshold is 7 is used for description. If the traversed text element is "光" (that is, a type of a text element is a word), in the first scan of the scan cycle, the quantity of times of scan processing that have been performed is 0, the scan quantity is 6, scan processing starting from "光" is performed according to the scan quantity and "荣的某国人民" are obtained, and combined "光荣的某国人民" are used as a candidate entity phrase. In the second scan of the scan cycle, the quantity of times of scan processing that have been performed is 1, the scan quantity is 5, scan processing starting from "光" is performed according to the scan quantity and "荣的某国人" are obtained, and combined "光荣的某国人" are used as a candidate entity phrase, and so on, until the scan quantity is equal to 0.

A process of performing scan processing according to the scan quantity may be selecting, starting from the traversed text element, a text element in the to-be-recognized text (the selected text element does not include the traversed text element) as a text element obtained through the scan processing, until a total quantity of text elements obtained through the scan processing is equal to the scan quantity. When a scan quantity according to which scan processing is performed is 0, because a text element obtained through the scan processing is null, the traversed text element may be used as a candidate entity phrase. In addition, a scan processing order may be an order from the first text element to the last text element in the to-be-recognized text (the foregoing example is provided based on the order), or may be an order from the last text element to the first text element in the to-be-recognized text.

A plurality of candidate entity phrases obtained by performing Step 202 may include repeated candidate entity phrases. Therefore, deduplication processing may be performed on all the obtained candidate entity phrases, that is, only one is retained in a plurality of same candidate entity phrases, to ensure a plurality of remaining candidate entity phrases obtained after the deduplication processing are different from each other, thereby saving subsequent computing resources.

In FIG. 4B, Step 103 shown in FIG. 4A may be implemented by performing Step 203 and Step 204, and is described in combination with the steps.

In Step 203, cyclic update processing can be sequentially performed on the text representations of the plurality of text elements in the candidate entity phrase in an order from the first text element to the last text element in the to-be-recognized text, to obtain a text representation update result of each text element in the candidate entity phrase. Herein, for each candidate entity phrase, cyclic update processing is sequentially performed on text representations of a plurality of text elements in the candidate entity phrase in an order from the first text element to the last text element in the to-be-recognized text, to obtain a text representation update result of each text element. The cyclic update processing is updating a text representation of any text element in the candidate entity phrase with reference to a text representation of an adjacent text element, to obtain a text representation update result of the any text element. In this way, comprehensiveness and accuracy of information included in the update result can be improved. The adjacent may be a previous one, or may include the previous one and a next one.

For example, referring to FIG. 3, in an integration module 2433, the text representations of the plurality of text elements in the candidate entity phrase may be sequentially inputted to an RNN model, to implement cyclic update processing based on a forward propagation process of the RNN model. Because the RNN model has strong sequence memory performance and semantic representation capabilities, accuracy of the obtained update result can be improved. The RNN model may be a unidirectional RNN model or a bidirectional RNN model. In the unidirectional RNN model, the adjacent text element is a previous text element. In the bidirectional RNN model, the adjacent text element includes a previous text element and a next text element.

In some embodiments, the sequentially performing cyclic update processing on the text representations of the plurality of text elements in the candidate entity phrase, to obtain a text representation update result of each text element in the candidate entity phrase may be implemented in such a manner: performing the following operations for a text representation of any text element in the candidate entity phrase: performing fusion processing on the text representation of the any text element and a first hidden state of a text representation of a previous text element, to obtain a first hidden state of the text representation of the any text element; performing fusion processing on the text representation of the any text element and a second hidden state of a text representation of a next text element, to obtain a second hidden state of the text representation of the any text element; and performing fusion processing on the first hidden state and the second hidden state of the text representation of the any text element, to obtain a text representation update result of the any text element.

Herein, an example of cyclic update processing is provided. For ease of understanding, a process of performing cyclic update processing on a text representation of any text element in the candidate entity phrase is described. In the process of cyclic update processing, fusion processing is performed on the text representation of the any text element and a first hidden state of a text representation of a previous text element, to obtain a first hidden state of the text representation of the any text element. The fusion processing may be weighted summation, or certainly may include other processing. For example, a weighted summation result is added with a bias term, and then activation processing is performed on an obtained result (the activation processing is implemented by using an activation function, and the activation function is, for example, a hyperbolic tangent function). In addition, fusion processing is performed on the text representation of the any text element and a second hidden state of a text representation of a next text element, to obtain a second hidden state of the text representation of the any text element. Then, fusion processing is performed on the first hidden state and the second hidden state of the text representation of the any text element, to obtain a text representation update result of the any text element. The foregoing manner may be implemented by using a bidirectional RNN model. In the foregoing manner, information from two directions can be integrated, thereby improving comprehensiveness and accuracy of information included in an update result.

For a text representation of the first text element in the candidate entity phrase, because a text representation of a previous text element does not exist, a first hidden state of the text representation of the previous text element may be set to zero. For a text representation of the last text element in the candidate entity phrase, because a text representation of a next text element does not exist, a second hidden state of the text representation of the next text element may be set to zero.

In Step 204, a text representation update result of the last text element in the candidate entity phrase can be used as the text representation of the candidate entity phrase. The text representation update result of the last text element in the candidate entity phrase is fused with more information in the candidate entity phrase. Therefore, the update result is used as the text representation of the candidate entity phrase, so that the text representation of the candidate entity phrase can comprehensively and effectively indicate a semantic meaning of the candidate entity phrase.

As shown in FIG. 4B, in the embodiments of this application, a candidate entity phrase is constructed in a traversing and scan cycle manner, which is applicable to a multi-nested case, and cyclic update processing is performed, which can improve accuracy and effectiveness of an obtained text representation of the candidate entity phrase.

Figure 4C:
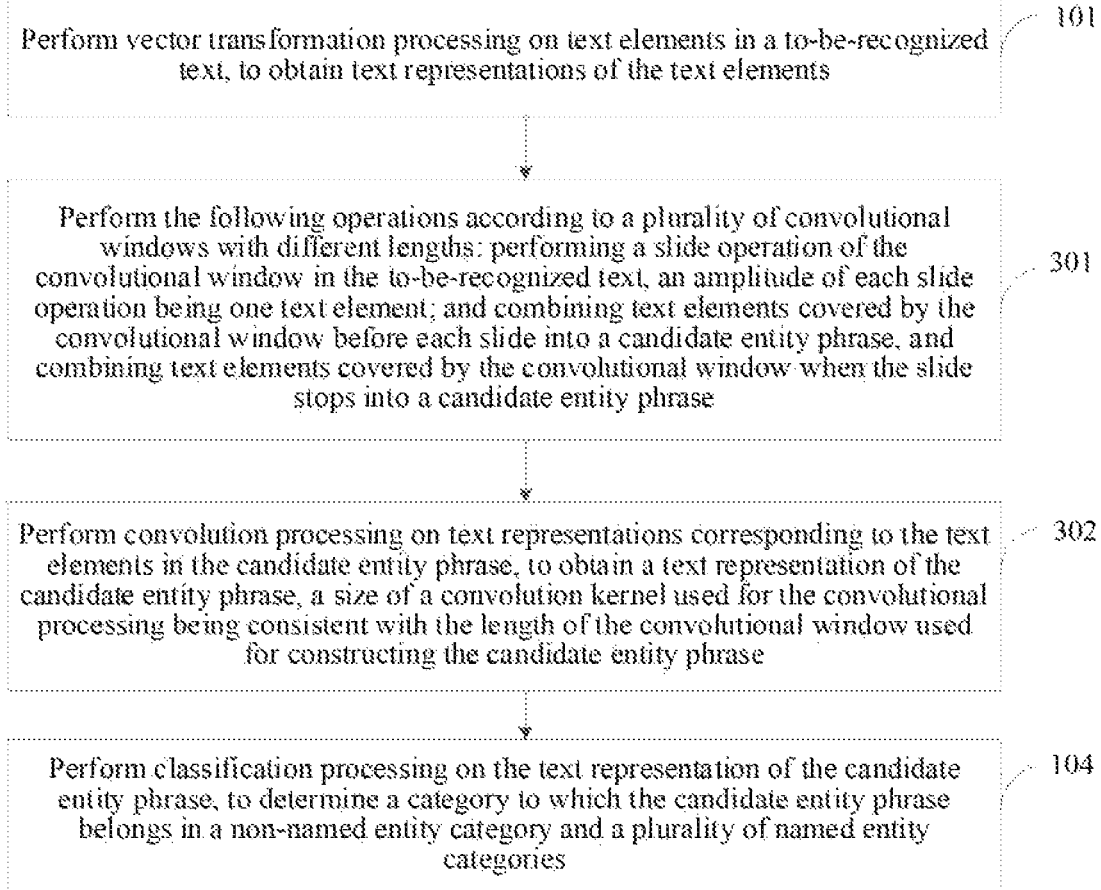

In some embodiments, FIG. 4C is a schematic diagram of an optional procedure of an AI-based NER method according to an embodiment of this application. Step 102 shown in FIG. 4A may be updated to Step 301. In Step 301, the following operations can be performed according to a plurality of convolutional windows with different lengths: performing a slide operation of the convolutional window in the to-be-recognized text, an amplitude of each slide operation being one text element; and combining text elements covered by the convolutional window before each slide into a candidate entity phrase, and combining text elements covered by the convolutional window in a case that the slide stops into a candidate entity phrase; the length of the convolutional window being less than or equal to the element quantity threshold.

For example, referring to FIG. 3, in the construction module 2432, a plurality of convolutional windows with different lengths are set according to the element quantity threshold. A length of each convolutional window is less than or equal to the element quantity threshold. Herein, the length of the convolutional window is a total quantity of text elements that can be covered by the convolutional window. To improve comprehensiveness of a constructed candidate entity phrase, the length may gradually increase starting from a convolutional window with a length of 1, until a convolutional window with a length reaching the element quantity threshold is obtained. For example, the element quantity threshold is 7, and convolutional windows with lengths of 1, 2, . . . , and 7 are sequentially set.

For each convolutional window, a slide operation of the convolutional window is performed in the to-be-recognized text, an amplitude of each slide operation being one text element. A slide operation order is not limited in the embodiments of this application, for example, may be slides starting from the first text element in the to-be-recognized text to the last text element in the to-be-recognized text, herein, a slide operation stop condition (the stop herein means that the slide operation is no longer performed) being that the convolutional window covers the last text element in the to-be-recognized text; in another example, may be slides starting from the last text element in the to-be-recognized text to the first text element in the to-be-recognized text, herein, a slide operation stop condition being that the convolutional window covers the first text element in the to-be-recognized text. Before each slide operation is performed, text elements covered by the convolutional window are combined into a candidate entity phrase, and when a slide operation stop condition is met, current text elements covered by the convolutional window are combined into a candidate entity phrase.

For example, the to-be-recognized text is "光荣的某国人民解放军", a convolutional window has a length of 3, and slides start from the first text element in the to-be-recognized text to the last text element in the to-be-recognized text according to the convolutional window. In this case, before the first slide, "光荣的" covered by the convolutional window are used as a candidate entity phrase. Before the second slide, "荣的某" covered by the convolutional window are used as a candidate entity phrase, and so on. When the convolutional window covers "解放军", the slides stop, and "解放军" are also used as a candidate entity phrase.

In FIG. 4C, Step 103 shown in FIG. 4A may be updated to step 302. In Step 302, convolution processing can be performed on the text representations corresponding to the text elements in the candidate entity phrase, to obtain the text representation of the candidate entity phrase, a size of a convolution kernel used for the convolutional processing being consistent with a length of a convolutional window used for constructing the candidate entity phrase. Herein, for each obtained candidate entity phrase, convolution processing is performed on text representations corresponding to all text elements in the candidate entity phrase, to obtain a text representation of the candidate entity phrase. A size of a convolution kernel used for the convolutional processing is consistent with a length of a convolutional window used for constructing the candidate entity phrase.

For example, referring to FIG. 3, in the integration module 2433, for each convolutional window, text representations corresponding to all text elements in a candidate entity phrase constructed based on the convolutional window are inputted to a CNN model, and an output obtained by the CNN model through forward propagation processing is determined as a text representation of the candidate entity phrase. A size of a convolution kernel of the CNN model is consistent with a length of the convolutional window.

As shown in FIG. 4C, in the embodiments of this application, a candidate entity phrase is constructed by sliding a convolutional window, so that construction of the candidate entity phrase is implemented from another angle, and convolutional processing is performed on text representations corresponding to text elements in the candidate entity phrase to obtain a text representation of the candidate entity phrase, which can improve accuracy and effectiveness of the obtained text representation of the candidate entity phrase.

Figure 4D:
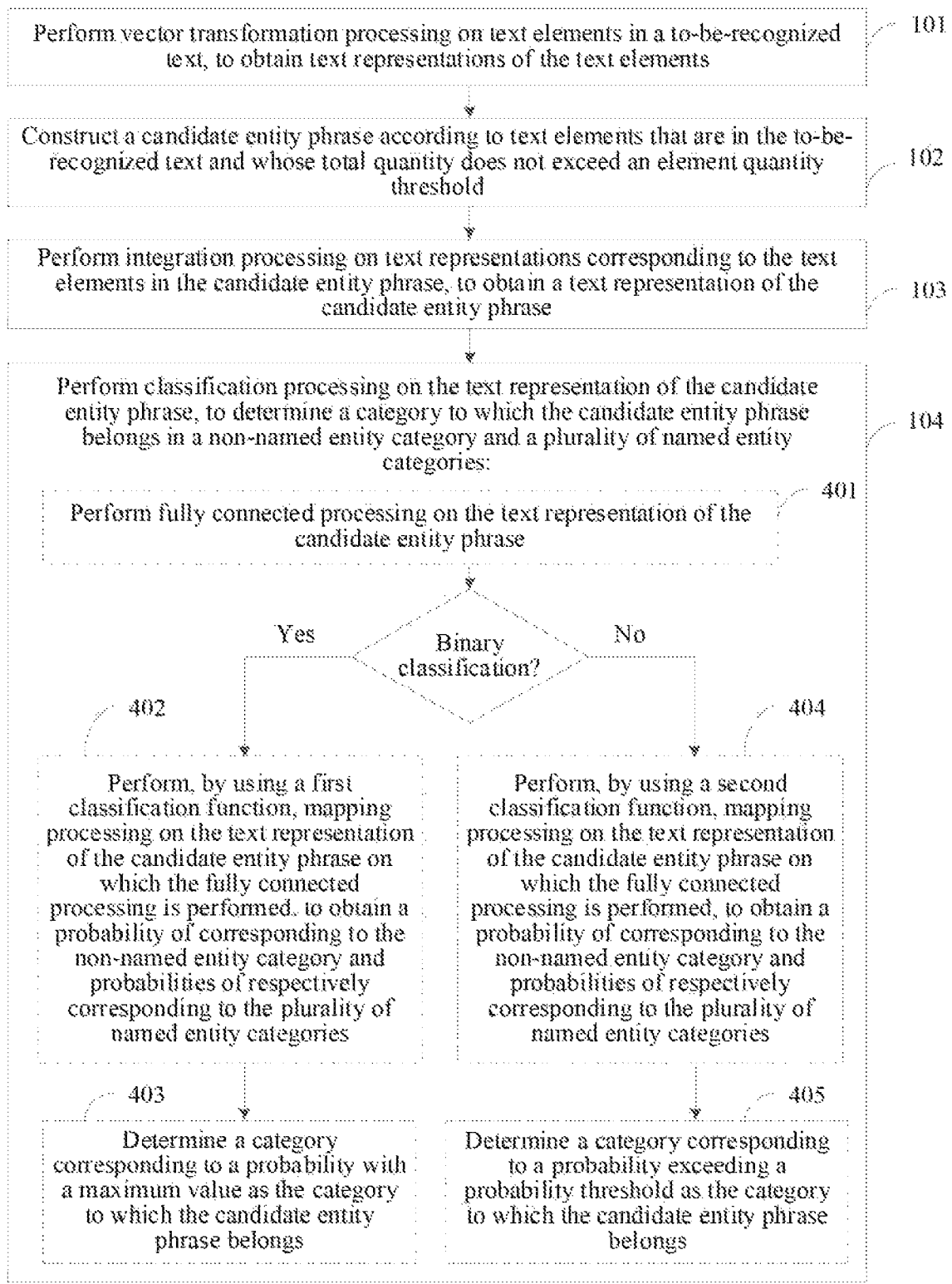

In some embodiments, FIG. 4D is a schematic diagram of an optional procedure of an AI-based NER method according to an embodiment of this application. Step 104 shown in FIG. 4A may be implemented by performing Step 401 to Step 405, and is described in combination with the steps.

In Step 401, fully connected processing can be performed on the text representation of the candidate entity phrase. For example, referring to FIG. 3, in a classification module 2434, fully connected processing is performed on the text representation of the candidate entity phrase by using a fully connected layer. The fully connected processing is performed to extract and integrate valid information in the text representation of the candidate entity phrase for subsequent classification.

In Step 402, mapping processing can be performed, by using a first classification function, on the text representation of the candidate entity phrase on which the fully connected processing is performed, to obtain a probability of corresponding to the non-named entity category and probabilities of respectively corresponding to the plurality of named entity categories, the first classification function being used for performing binary classification on the candidate entity phrase.

For example, referring to FIG. 3, in the classification module 2434, when an NER task is a binary classification task, mapping processing is performed, by using a first classification function, on the text representation of the candidate entity phrase on which the fully connected processing is performed, to obtain a probability of corresponding to the non-named entity category and probabilities of respectively corresponding to the plurality of named entity categories. The first classification function may be a Softmax classification function. In the embodiments of this application, the binary classification means determining, when no multi-category named entity exists, whether a candidate entity phrase belongs to the non-named entity category or the named entity category.

In Step 403, a category can be determined corresponding to a probability with a maximum value as the category to which the candidate entity phrase belongs. Herein, the category corresponding to the probability with the maximum value is determined as the category to which the candidate entity phrase belongs. That is, the category to which the candidate entity phrase belongs is either the non-named entity category or the named entity category.

In Step 404, mapping processing can be perform, by using a second classification function, on the text representation of the candidate entity phrase on which the fully connected processing is performed, to obtain a probability of corresponding to the non-named entity category and probabilities of respectively corresponding to the plurality of named entity categories.

For example, referring to FIG. 3, in the classification module 2434, when an NER task is a multi-class classification task, mapping processing is performed, by using a second classification function, on the text representation of the candidate entity phrase on which the fully connected processing is performed, to obtain a probability of corresponding to the non-named entity category and probabilities of respectively corresponding to the plurality of named entity categories. The second classification function may be a Softmax classification function. In the embodiments of this application, the multi-class classification means determining, when a multi-category named entity exists, whether a candidate entity phrase belongs to the non-named entity category or at least one named entity category.

In Step 405, a category can be determined corresponding to a probability exceeding a probability threshold as the category to which the candidate entity phrase belongs. In a multi-class classification case, a probability threshold is set, and a category corresponding to a probability exceeding the probability threshold is determined as the category to which the candidate entity phrase belongs. In this case, the candidate entity phrase may belong to one or more categories.

As shown in FIG. 4D, in the embodiments of this application, in binary classification and multi-class classification cases, different classification functions are used for classification processing, thereby improving flexibility of NER.

Figure 5:
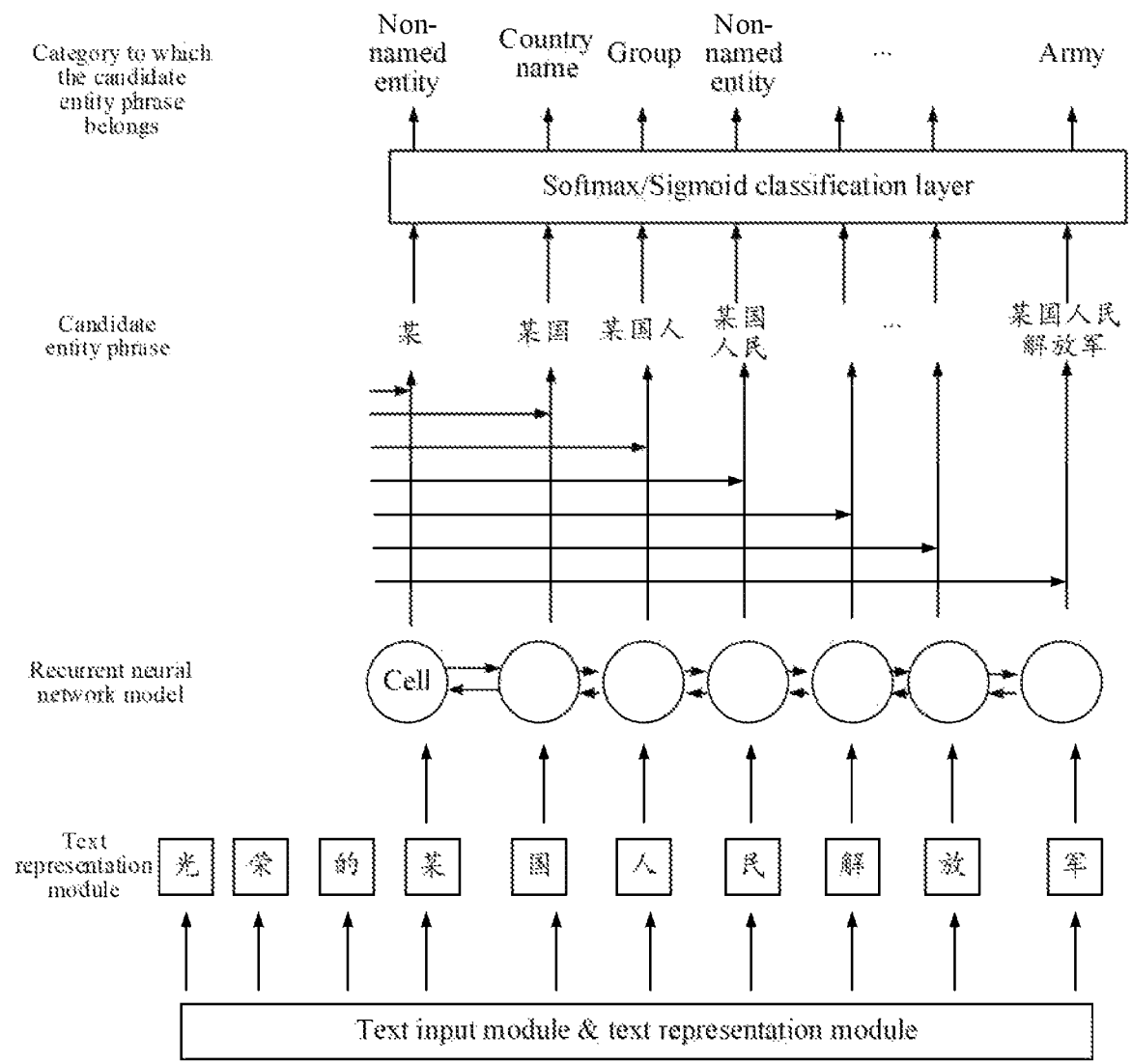
FIG. 5 is a schematic diagram of an architecture of NER using a recurrent neural network (RNN) model according to an exemplary embodiment of this disclosure.

The following describes an exemplary application of the embodiments of this application in an actual application scenario. The embodiments of this application provide a schematic diagram of an optional architecture of NER using an RNN model, as shown in FIG. 5, which is explained below in a bottom-to-top order.

(1) Text Input Module & Text Representation Module.

The module is generally an NLP model structure having a text representation capability and other extensions based on a representation structure, which may be set according to an actual application scenario. For example, the module may apply a BERT model and its improvements. A to-be-recognized text is inputted to the module, to obtain text representations of text elements in the to-be-recognized text. A type of the text element is a word or a phrase. FIG. 5 shows an example in which the type of the text element is a word for description.

(2) Text Representation Module.

In FIG. 5, the to-be-recognized text is "光荣的某国 人民解放军", after processing of the text input module & text representation module, a text representation in a vector form of each word in the to-be-recognized text is obtained, which is shown by a box in FIG. 5 as an example.

(3) RNN Model.

In the embodiments of this application, the RNN model is generally an RNN model and its variants, for example, a long short-term memory (LSTM) model and a gated recurrent unit (GRU) model. FIG. 5 shows a bidirectional RNN model as an example. Each circle in the model represents a cell in a step. An input of the cell is a text representation of a text element. For any cell in the bidirectional RNN model, the cell is configured to transfer a first hidden state of an input text representation to a next cell, and is further configured to transfer a second hidden state of the input text representation to a previous cell.

A process of constructing a candidate entity phrase may be divided into two layers of processing. A first layer is traversing processing, and a second layer is a scan cycle. In the first layer of traversing processing, the traversing processing is performed in an order from the first text element to the last text element in the to-be-recognized text. The traversing processing is performed to completely cover the first words of all possible candidate entity phrases in the to-be-recognized text. Using the foregoing to-be-recognized text as an example, text elements (the first words of candidate entity phrases) traversed in a traversing processing process are sequentially as follows:

光→荣→的→荣→国→人→民→解→放→军

Text representations corresponding to the traversed text elements are used as input vectors in the first step in the RNN model. Different traversed text elements are inputted to RNN models independently. That is, a text representation corresponding to a current traversed text element is not used as an input to a next RNN model, and a new RNN model is used for a text representation corresponding to a next traversed text element, which is used as an input vector in the first step of the new RNN model. For example, when the traversed text element is "光", a text representation corresponding to "光" is used as an input vector in the first step in an RNN model. When the traversed text element is "荣", a text representation corresponding to "荣" is used as an input vector in the first step in another RNN model.

After the traversed text element is determined, that is, the first word is determined, a complete scan cycle is performed. The scan cycle is starting candidate entity phrases with the first word, and cyclically scanning, according to a scan quantity (the scan quantity is initially 0) that gradually increases, each candidate entity phrase starting with the first word, until the scan quantity reaches a scan quantity threshold. The scan quantity threshold is a result obtained by subtracting one from an element quantity threshold. For example, if the traversed text element (the first word) is "某", a scan cycle is started. That is, the word "某" is used as the first word of candidate entity phrases, and the scan quantity gradually increases. For example, the element quantity threshold is 7. In this case, in the scan cycle, scan processing is first performed according to the scan quantity with a value of 0, and "某" is used as a candidate entity phrase. Then, scan processing is performed according to the scan quantity with a value of 1, to obtain a candidate entity phrase "某国". Then, scan processing is performed according to the scan quantity with a value of 2, to obtain a candidate entity phrase "某国人", and so on, until a value of the scan quantity is 6, to obtain a candidate entity phrase, that is, "某国人民解放军", in which a quantity of included text elements reaches the element quantity threshold. So far, one scan cycle is completed.

When candidate entity phrases are constructed, text representations corresponding to scanned words are sequentially inputted to the RNN model step by step, and an output (corresponding to the foregoing update result) of an RNN step corresponding to a current scanned word is used as a text representation of a candidate entity phrase constructed by "the first word" to the current scanned word. For example, for a candidate entity phrase "某国人", text representations corresponding to "某", "国", and "人" are sequentially inputted to the RNN model step by step, and an output of a step corresponding to "人" is determined as a text representation of the candidate entity phrase "某国人". With the traversing processing and the scan cycle, sequence memory performance and semantic representation capabilities of the RNN model can be better used, so that the obtained text representation of the candidate entity phrase can accurately and effectively indicate a semantic meaning of the candidate entity phrase.

(4) Candidate Entity Phrase.

FIG. 5 shows a plurality of candidate entity phrases constructed after the traversing processing and the scan cycle. For each candidate entity phrase, a text representation of the candidate entity phrase may be obtained through forward propagation processing of the RNN model.

(5) Softmax/Sigmoid Classification Layer.

The classification layer can be configured to respectively perform classification processing on text representations of the plurality of candidate entity phrases outputted by the RNN model. The embodiments of this application provide two classification manners, that is, two activation (classification) functions: Softmax and Sigmoid, respectively. When no multi-category named entity exists in the to-be-recognized text, that is, in a case of a binary classification task, the Softmax activation function may be used. A text representation of each obtained candidate entity phrase is classified by using a structure such as a fully connected layer in combination with the Softmax activation function, to finally obtain the most possible category to which the candidate entity phrase belongs. When a multi-category named entity exists in the to-be-recognized text, that is, in a case of a multi-class classification task, the Sigmoid activation function may be used. A text representation of each obtained candidate entity phrase is classified by using a structure such as a fully connected layer in combination with the Sigmoid activation function, to finally obtain, by setting a probability threshold, a possible category to which the candidate entity phrase belongs. In a classification process, a non-named entity category can be treated equally with other named entity categories.

For example, as shown in FIG. 5, after classification processing of the classification layer, the following is obtained: a category to which the candidate entity phrase "某" belongs is the non-named entity category, a category to which the candidate entity phrase "某国" is a country name category, a category to which the candidate entity phrase "某国人" is a group category, and a category to which the candidate entity phrase "某国人民解放军" is an army category. After NER is completed, an obtained named entity (that is, a candidate entity phrase belonging to any named entity category) may be applied to various application scenarios of the NLP field. For example, in a scenario of new word discovery, the obtained named entity may be added to a knowledge graph, to implement automatic mining of a new named entity.

Figure 6:
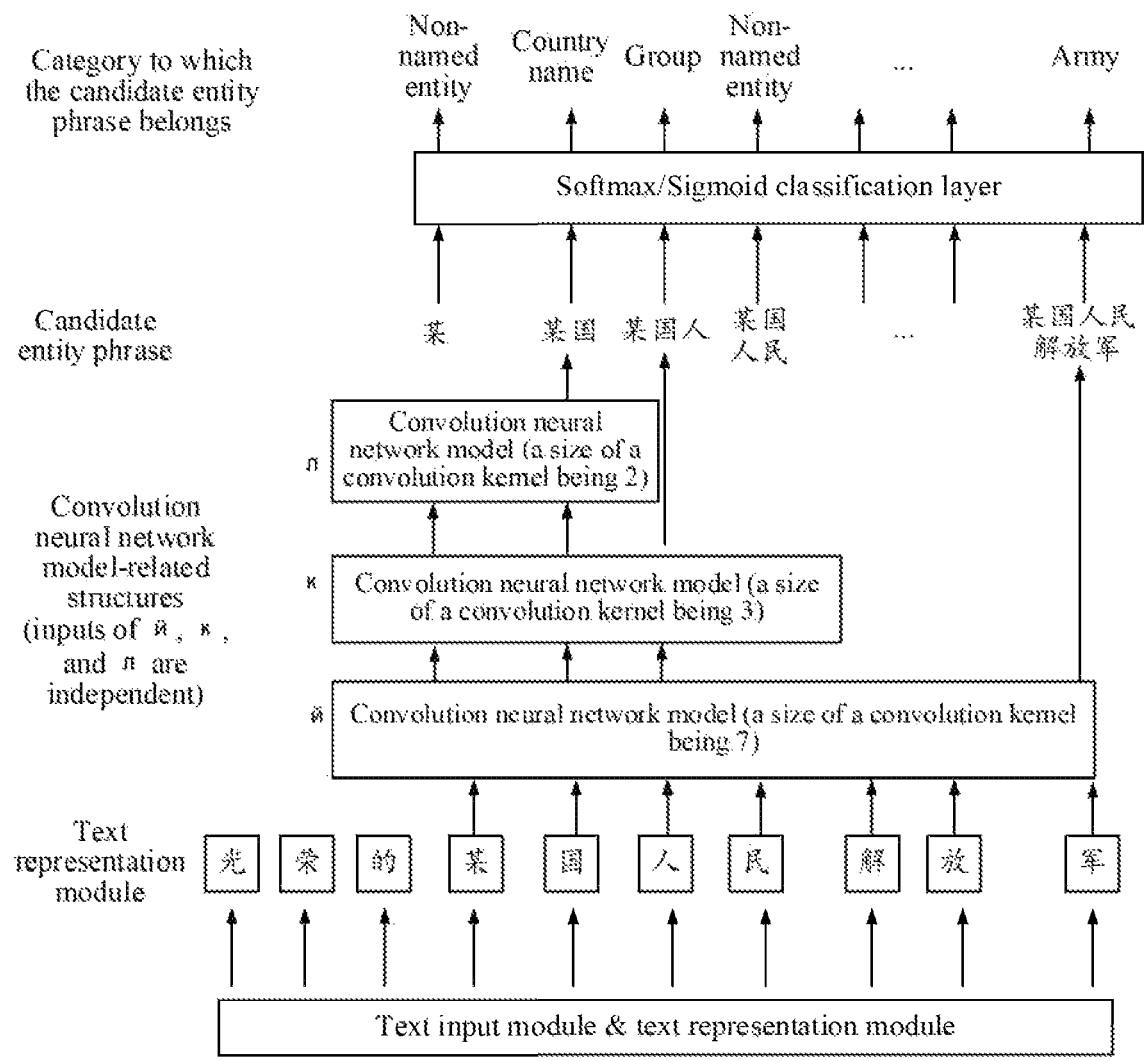
FIG. 6 is a schematic diagram of an architecture of NER using a convolutional neural network (CNN) model according to an exemplary embodiment of this disclosure.

The exemplary embodiments of this disclosure further provide a schematic diagram of an optional architecture of NER using a CNN model, as shown in FIG. 6, which is explained below in a bottom-to-top order.

(1) Text input module & text representation module.

(2) Text representation module.

The text input module & text representation module and the text representation module in FIG. 6 are similar to corresponding content in FIG. 5.

(3) CNN model.

The CNN model in this part is generally a CNN model and its variants, or the like. FIG. 6 shows an original CNN model as an example. For a preset element quantity threshold, CNN models with a plurality sizes of convolution kernels are used, to perform one-dimensional CNN processing on text representations of text elements in a candidate entity phrase.

For example, when the element quantity threshold is 7, convolution kernels of seven sizes are set, the sizes being sequentially 1 to 7. A quantity of convolution kernels may be set according to a specific actual application scenario, and quantities of convolution kernels of different sizes may be set to be the same. In addition, a convolutional window whose length is the same as the size of the convolution kernel is set, and a slide operation is performed on the convolutional window in an order from the first text element to the last text element in the to-be-recognized text. Text elements covered by the convolutional window before each slide are combined into a candidate entity phrase, and text elements covered by the convolutional window when the slide stops are combined into a candidate entity phrase. Then, text representations of all text elements in the candidate entity phrase are inputted to a CNN model with a convolution kernel of a corresponding size. A convolutional output result of the CNN model is a text representation of the candidate entity phrase.

As shown in FIG. 6, when a convolutional window with a length of 3 covers "某国人", a text representation of "某", a text representation of "国", and a text representation of "人" are inputted to a CNN model (which is a CNN model with a convolution kernel having a size of 3), and an output result obtained by the CNN model through convolutional processing is used as a text representation of the candidate entity phrase "某国人".

(4) Candidate entity phrase.

As shown in FIG. 6, candidate entity phrases constructed by "某", "某国", "某国人", and the like are shown.

(5) Softmax/Sigmoid classification layer.

A Softmax/Sigmoid classification layer in FIG. 6 is similar to corresponding content in FIG. 5. Similarly, different activation functions are used for different classification tasks.

Compared with the nested NE BILOU encoding and decoding solution provided in the related art, in the AI-based NER method provided in the embodiments of this application, it is unnecessary to manually formulate complex encoding and decoding rules, which improves efficiency and flexibility of NER. In addition, compared with other solutions provided in the related art, the embodiments of this application also have certain advantages.

For example, compared with an MGNER solution of performing NER by using a depth learning model of a complex structure, in the embodiments of this application, a model structure is simpler, and a semantic expression capability for candidate entity phrases can be more effectively enhanced, and performance indicators of the model can be improved. As verified by experiments, when tested by using the same text representation structure based on embedding from language models (ELMo), indicators of the two solutions are compared as follows:

For an open-source ACE2004 public data set, an F1 score of the MGNER model solution is 79.5%, and an F1 score of the method provided in the embodiments of this application is 83.7%. For an ACE2005 public data set, an F1 score of the MGNER model solution is 78.2%, and an F1 score of the method provided in the embodiments of this application is 82.4%. The F1 score is a harmonic average of a precision rate and a recall rate.

In addition, in a solution provided in the related art, NER may alternatively be implemented through an idea of machine reading comprehension (MRC). However, the solution requires a model to be run independently for each named entity category, which consumes a relatively long time. In the method provided in the embodiments of this application, all possible candidate entity phrases in a to-be-recognized text and categories to which the candidate entity phrases belong can be produced by running once, which has relatively high efficiency. When an ACL-NNE public data set with 115 named entity categories is used for testing, when based on the same BERT model as the MRC framework solution, compared with the MRC framework solution, the method provided in the embodiments of this application can save more than 90% of time.

An NER result may be applied to various application scenarios of the NLP field, such as scenarios of abstract determining, object recommendation, text classification, and a question answering system, and scenarios of information extraction, grammatical analysis, and machine translation. Herein, the scenario of the question answering system is used for detailed description.

Figure 7:
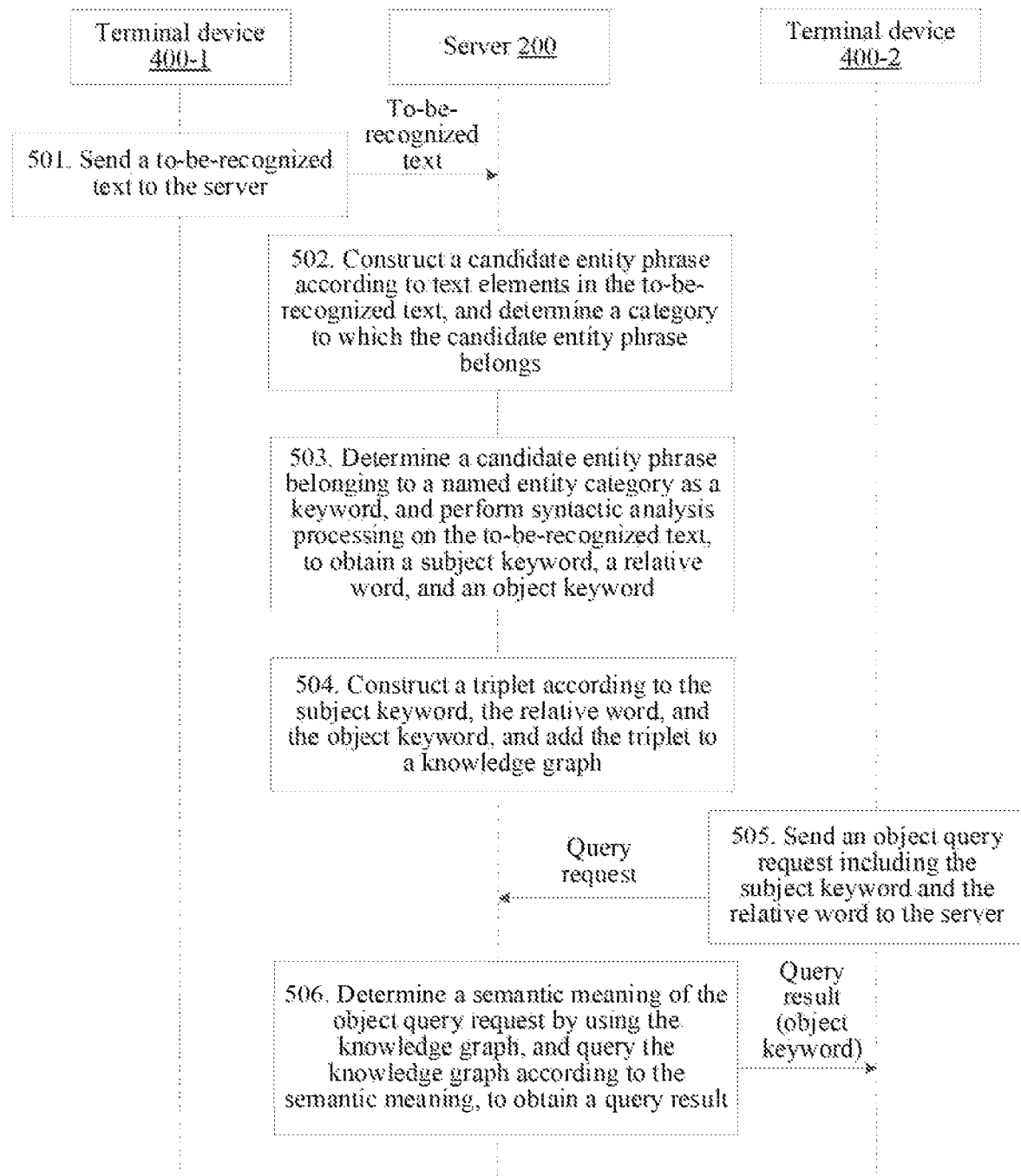
FIG. 7 is a schematic diagram of a procedure of a question answering scenario according to an exemplary embodiment of this disclosure.

The embodiments of this application provide a schematic diagram of a procedure of question answering, as shown in FIG. 7. In FIG. 7, a terminal device 400-1 and a terminal device 400-2 are held by different users. For ease of distinguishing, the terminal device 400-1 is named as a first terminal device, and the terminal device 400-2 is named as a second terminal device. A question answering process is described with reference to steps shown in FIG. 7.

In Step 501, the first terminal device can send a to-be-recognized text to a server. The user of the first terminal device sends the to-be-recognized text to the server by using the first terminal device. Herein, a source of the to-be-recognized text is not limited. For example, the to-be-recognized text may be an entry text of a person or a description text of a product.

In Step 502, the server constructs a candidate entity phrase according to text elements in the to-be-recognized text, and determines a category to which the candidate entity phrase belongs. For example, the server may construct, in an exhaustive manner, all candidate entity phrases that may occur, and determine a category to which each candidate entity phrase belongs, referring to steps 101 to step 104.

In Step 503, the server determines a candidate entity phrase belonging to a named entity category as a keyword, and performs syntactic analysis processing on the to-be-recognized text, to obtain a subject keyword, a relative word, and an object keyword. Herein, the server determines a candidate entity phrase belonging to any named entity category as a keyword, and further performs syntactic analysis processing on the to-be-recognized text, to obtain a subject keyword, a relative word, and an object keyword that are in a dependence relationship in the to-be-recognized text. The relative word is used for indicating a relationship between the subject keyword and the object keyword. For example, the to-be-recognized text is "张三向李四借钱", and after syntactic analysis processing, the following is obtained: a subject keyword is "张三", a relative word is "借钱", and an object keyword is "李四"

In Step 504, the server constructs a triplet according to the subject keyword, the relative word, and the object keyword, and adds the triplet to a knowledge graph. Herein, an SPO triplet is constructed according to the subject keyword, the relative word, and the object keyword. For example, the SPO triplet is "张三-借钱-李四". Then, the server adds the constructed SPO triplet to the knowledge graph, and "张三" and "李四" may also be added to the knowledge graph as named entities.

In Step 505, the second terminal device can send an object query request including the subject keyword and the relative word to the server. For example, the second terminal device sends an object query request "张三向谁借钱?" to the server.

In Step 506, the server can determine a semantic meaning of the object query request by using the knowledge graph, and queries the knowledge graph according to the semantic meaning, to obtain a query result. Herein, the server may match the object query request with named entities in the knowledge graph. For example, "张三向谁借钱?" is matched with the named entities in the knowledge graph, and an obtained named entity that is in the object query request and matches the knowledge graph is "张三". Alternatively, the server may obtain, in the manner of step 101 to step 104, a category to which a candidate entity phrase in the object query request belongs, and match a candidate entity phrase belonging to a named entity category with the knowledge graph.

Then, the server may further perform syntactic analysis processing according to a named entity that is in the object query request and matches the knowledge graph, to obtain a semantic meaning of the query request, for example, "张三-借钱-?". The server queries the knowledge graph according to the semantic meaning of the object query request, to obtain a corresponding query result, and sends the query result to the second terminal device, to answer the question, for example, sends the object keyword "李四" as the query result to the second terminal device.

As shown in FIG. 7, in the embodiments of this application, a knowledge graph is expanded according to an NER result, which improves accuracy of knowledge in the knowledge graph, and improves precision of a question answering system based on the knowledge graph, so that a user can get good user experience when participating in question answering.

The following further describes an exemplary structure of the AI-based NER apparatus 243 provided in the embodiments of this disclosure, which is implemented as software modules. In some embodiments, as shown in FIG. 2, software modules in the AI-based NER apparatus 243 stored in the memory 240 may include: a vector transformation module 2431, configured to perform vector transformation processing on text elements in a to-be-recognized text, to obtain text representations of the text elements; a construction module 2432, configured to construct a candidate entity phrase according to text elements that are in the to-be-recognized text and whose total quantity does not exceed an element quantity threshold; an integration module 2433, configured to perform integration processing on text representations corresponding to the text elements in the candidate entity phrase, to obtain a text representation of the candidate entity phrase; and a classification module 2434, configured to perform classification processing on the text representation of the candidate entity phrase, to determine a category to which the candidate entity phrase belongs in a non-named entity category and a plurality of named entity categories.

In some embodiments, the construction module 2432 is configured to perform traversing processing on the text elements in the to-be-recognized text; and perform, for a traversed text element, a scan cycle including a plurality times of scan processing: determining, according to a quantity of times of scan processing that have been performed in the scan cycle, a scan quantity that synchronously increases or decreases, and performing, according to the scan quantity, scan processing starting from the traversed text element, and combining the traversed text element and a text element obtained through the scan processing into a candidate entity phrase, until the scan quantity that is initially zero increases to a scan quantity threshold, or the scan quantity that is initially the scan quantity threshold decreases to zero; the scan quantity threshold being a result obtained by subtracting one from the element quantity threshold.

In some embodiments, the integration module 2433 is configured to sequentially perform cyclic update processing on the text representations of the plurality of text elements in the candidate entity phrase in an order from the first text element to the last text element in the to-be-recognized text, to obtain a text representation update result of each text element in the candidate entity phrase; and use a text representation update result of the last text element in the candidate entity phrase as the text representation of the candidate entity phrase.

In some embodiments, the integration module 2433 is configured to perform the following operations for a text representation of any text element in the candidate entity phrase: performing fusion processing on the text representation of the any text element and a first hidden state of a text representation of a previous text element, to obtain a first hidden state of the text representation of the any text element; performing fusion processing on the text representation of the any text element and a second hidden state of a text representation of a next text element, to obtain a second hidden state of the text representation of the any text element: and performing fusion processing on the first hidden state and the second hidden state of the text representation of the any text element, to obtain a text representation update result of the any text element.

In some embodiments, the construction module 2432 is configured to select, starting from the traversed text element, a text element in the to-be-recognized text as a text element obtained through the scan processing, until a total quantity of text elements obtained through the scan processing is equal to the scan quantity.

In some embodiments, the construction module 2432 is configured to perform the following operations according to a plurality of convolutional windows with different lengths: performing a slide operation of the convolutional window in the to-be-recognized text, an amplitude of each slide operation being one text element; and combining text elements covered by the convolutional window before each slide into a candidate entity phrase, and combining text elements covered by the convolutional window in a case that the slide stops into a candidate entity phrase; the length of the convolutional window being less than or equal to the element quantity threshold.

In some embodiments, the integration module 2433 is configured to perform convolution processing on the text representations corresponding to the text elements in the candidate entity phrase, to obtain the text representation of the candidate entity phrase; a size of a convolution kernel used for the convolutional processing being consistent with a length of a convolutional window used for constructing the candidate entity phrase.

In some embodiments, the classification module 2434 is configured to perform fully connected processing on the text representation of the candidate entity phrase; perform, by using a first classification function, mapping processing on the text representation of the candidate entity phrase on which the fully connected processing is performed, to obtain a probability of corresponding to the non-named entity category and probabilities of respectively corresponding to the plurality of named entity categories; and determine a category corresponding to a probability with a maximum value as the category to which the candidate entity phrase belongs; the first classification function being used for performing binary classification on the candidate entity phrase.

In some embodiments, the classification module 2434 is configured to perform fully connected processing on the text representation of the candidate entity phrase; perform, by using a second classification function, mapping processing on the text representation of the candidate entity phrase on which the fully connected processing is performed, to obtain a probability of corresponding to the non-named entity category and probabilities of respectively corresponding to the plurality of named entity categories; and determine a category corresponding to a probability exceeding a probability threshold as the category to which the candidate entity phrase belongs; the second classification function being used for performing multi-class classification on the candidate entity phrase.

In some embodiments, the AI-based NER apparatus 243 further includes: a segmentation module, configured to perform segmentation processing on the to-be-recognized text to obtain a plurality of sentences; an abstract keyword determining module, configured to determine, as an abstract keyword, a candidate entity phrase that belongs to any named entity category and whose occurrence frequency meets a frequency condition; a score determining module, configured to determine a score of the sentence according to a quantity of abstract keywords included in the sentence; and an abstract determining module, configured to determine a sentence whose score meets a score condition as a text abstract of the to-be-recognized text.

In some embodiments, the AI-based NER apparatus 243 further includes: a first keyword determining module, configured to determine, in a case that the to-be-recognized text is used for indicating a to-be-recommended object, a candidate entity phrase belonging to any named entity category as a keyword of the to-be-recommended object; a user portrait obtaining module, configured to obtain a user portrait keyword, and determine a keyword coincidence degree between the user portrait keyword and the keyword of the to-be-recommended object; and a recommendation module, configured to perform an operation of recommending the to-be-recommended object in a case that the keyword coincidence degree exceeds a first coincidence degree threshold.

In some embodiments, the user portrait obtaining module is configured to determine an intersection set between the user portrait keyword and the keyword of the to-be-recommended object, and determine a first quantity of keywords included in the intersection set; determine a union set between the user portrait keyword and the keyword of the to-be-recommended object, and determine a second quantity of keywords included in the union set; and determine a ratio of the first quantity to the second quantity as the keyword coincidence degree between the user portrait keyword and the keyword of the to-be-recommended object.

In some embodiments, the AI-based NER apparatus 243 further includes: a second keyword determining module, configured to determine a candidate entity phrase belonging to any named entity category as a keyword; a coincidence degree calculation module, configured to determine a keyword coincidence degree between a first to-be-recognized text and a second to-be-recognized text; and a classification module, configured to classify the first to-be-recognized text and the second to-be-recognized text into the same text class in a case that the keyword coincidence degree exceeds a second coincidence degree threshold.

In some embodiments, the AI-based NER apparatus 243 further includes: a third keyword determining module, configured to determine a candidate entity phrase belonging to any named entity category as a keyword; a syntactic analysis module, configured to perform syntactic analysis processing on the to-be-recognized text, to obtain a subject keyword, a relative word, and an object keyword in the to-be-recognized text, the relative word being used for indicating a relationship between the subject keyword and the object keyword; and an addition module, configured to construct a triplet according to the subject keyword, the relative word, and the object keyword, and add the triplet to a knowledge graph; the knowledge graph being used for responding to an object query request including the subject keyword and the relative word.

In some embodiments, the AI-based NER apparatus 243 further includes: an entity addition module, configured to add a candidate entity phrase belonging to any named entity category to a knowledge graph; the knowledge graph being used for responding to a category query request for a candidate entity phrase belonging to a named entity category.

In some embodiments, the AI-based NER apparatus 243 further includes: an element recognition module, configured to perform either of the following operations, to obtain the text elements in the to-be-recognized text: using each word in the to-be-recognized text as a text element; and performing word segmentation processing on the to-be-recognized text, and using a phrase obtained through the word segmentation processing as a text element.

The embodiments of this application provide a computer-readable storage medium storing executable instructions, the executable instructions, when executed by a processor, causing the processor to perform the method provided in the embodiments of this application, for example, the AI-based NER method shown in FIG. 4A, FIG. 4B, FIG. 4C, or FIG. 4D. The computer includes various computing devices including terminal devices and servers.

In some embodiments, the computer-readable storage medium may be a FRAM, a ROM, a PROM, an EPROM, an EEPROM, a flash memory, a magnetic surface storage, an optical disc, a CD-ROM, or other memories; or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

Based on the above, the numerous technical effects can be achieved through the embodiments described in this disclosure. For example, the embodiments of this application provide a refined and easy-to-use manner for constructing candidate entity phrases, sequence information in a to-be-recognized text is integrated one by one in a specific order and in different spans, and candidate entity phrases in the to-be-recognized text can be fully enumerated. In the embodiments of this application, a model structure is simple and flexible, which is convenient to be further improved according to a requirement in an actual application scenario, and is easy to be transplanted to more deep learning models.

Additionally, the exemplary embodiments of this disclosure conform to application characteristics of an RNN model and a CNN model in the NLP field. Integration processing is performed on text representations of text elements in the to-be-recognized text in a specific order by using a related structure of the RNN model or the CNN model, to obtain a text representation of a candidate entity phrase, which can more simply and effectively enhance a semantic expression capability for candidate entity phrases, and improve performance indicators of the model, thereby giving consideration to simplicity and effectiveness.

Further, in the embodiments of this disclosure, all the candidate entity phrases in the to-be-recognized text and categories to which the candidate entity phrases belong can be produced by running once, so that much time can be saved, and the categories to which the candidate entity phrases belong can be obtained relatively quickly. In the embodiments of this application, for specific classification tasks (binary classification/multi-class classification), corresponding classification functions can be used for classification processing, which improves applicability to different application scenarios. When the to-be-recognized text includes a plurality of sentences, in the embodiments of this application, importance of each sentence can be determined according to candidate entity phrases belonging to named entity categories, to select a text abstract, which improves accuracy of abstract selection.

Moreover, for an object recommendation scenario, in the embodiments of this disclosure, a keyword in the to-be-recognized text is matched with a user portrait keyword, to recommend an object in line with user preference as much as possible, which improves user experience and a conversion rate of the recommended object. In the embodiments of this application, keywords of two texts can be compared, and whether to classify the two texts into one class is determined according to an obtained keyword coincidence degree, which improves accuracy of text classification.

Also, in the embodiments of this disclosure, after NER is performed, a candidate entity phrase belonging to a named entity category may be added to a knowledge graph to improve accuracy of new word discovery. In addition, a relationship between named entities in the to-be-recognized text may also be added to the knowledge graph, so that an expanded knowledge graph can be better applied to scenarios such as question answering.

The foregoing descriptions are merely exemplary embodiments of this disclosure and are not intended to limit the protection scope of this application. Any modification, equivalent replacement, or improvement made without departing from the spirit and range of this disclosure shall fall within the protection scope of this application.

What is claimed is:

1. An artificial intelligence (AI)-based named entity recognition (NER) method, the method comprising:
   performing, by processing circuitry, vector transformation processing on text elements in a to-be-recognized text to obtain text representations of the text elements;
   constructing, by the processing circuitry, a plurality of candidate entity phrases by generating sub-strings of the to-be-recognized text, each candidate entity phrase including a total quantity of consecutive text elements that is less than an element quantity threshold;
   performing, by the processing circuitry, integration processing on the text representations corresponding to the text elements in each candidate entity phrase to obtain a phrase-level text representation for the respective candidate entity phrase; and
   performing, by the processing circuitry, classification processing on the phrase-level text representation of each candidate entity phrase to determine a category to which the respective candidate entity phrase belongs in a non-named entity category and a plurality of named entity categories by:
      performing fully connected processing on the phrase-level text representation of the respective candidate entity phrase; and
      using a first classification function and a second classification function, wherein both of the first classification function and the second classification function perform mapping processing on the same phrase-level text representation of the respective candidate entity phrase after the fully connected processing, the first classification function performs binary classification on the respective candidate entity phrase based on the non-named entity category and the plurality of named entity categories, and the second classification function performs multi-class classification on the respective candidate entity phrase into one of the plurality of named entity categories.

2. The NER method according to claim 1, wherein the constructing the plurality of candidate entity phrases further comprises:
   performing traversing processing on the text elements in the to-be-recognized text;
   performing a scan cycle that includes a plurality times of scan processing of a traversed text element;
   determining a scan quantity that synchronously increases or decreases based on a quantity of times that the scan processing has been performed in the scan cycle, and performing the scan processing starting from the traversed text element based on the scan quantity; and
   combining the traversed text element and a text element obtained through the scan processing into a candidate entity phrase of the plurality of candidate entity phrases until the scan quantity that is initially zero increases to a scan quantity threshold, or the scan quantity that is initially the scan quantity threshold decreases to zero, wherein the scan quantity threshold is a result obtained by subtracting one from the element quantity threshold.

3. The NER method according to claim 2, wherein the performing, according to the scan quantity, the scan processing starting from the traversed text element comprises:
   selecting, starting from the traversed text element, a text element in the to-be-recognized text as a text element obtained through the scan processing, until a total quantity of the text elements obtained through the scan processing is equal to the scan quantity.

4. The NER method according to claim 1, wherein the performing the integration processing on the text representations further comprises:
   sequentially performing cyclic update processing on the text representations of a plurality of the text elements in the respective candidate entity phrase in an order from a first text element to a last text element in the to-be-recognized text to obtain a text representation update result of each text element in the candidate entity phrase; and
   using a text representation update result of the last text element in the candidate entity phrase as the phrase-level text representation of the candidate entity phrase.

5. The NER method according to claim 4, wherein the sequentially performing the cyclic update processing on the text representations of the plurality of the text elements in the respective candidate entity phrase further comprises:
   performing fusion processing on the text representation of any text element and a first hidden state of a text representation of a previous text element to obtain a first hidden state of the text representation of the any text element;
   performing fusion processing on the text representation of the any text element and a second hidden state of a text representation of a next text element to obtain a second hidden state of the text representation of the any text element; and
   performing fusion processing on the first hidden state and the second hidden state of the text representation of the any text element to obtain a text representation update result of the any text element.

6. The NER method according to claim 1, wherein the constructing the plurality of candidate entity phrases further comprises performing for a plurality of convolutional windows with different lengths:
   performing a slide operation of the respective convolutional window in the to-be-recognized text, an amplitude of each slide operation being one text element; and
   combining the text elements covered by the respective convolutional window before each slide into a candidate entity phrase of the plurality of candidate entity phrases, and combining the text elements covered by the respective convolutional window in a case that the slide stops into the candidate entity phrase,
   wherein the lengths of the convolutional windows are less than or equal to the element quantity threshold.

7. The NER method according to claim 6, wherein the performing the integration processing on the text representations corresponding to the text elements in the candidate entity phrase further comprises:
   performing convolution processing on the text representations corresponding to the text elements in the candidate entity phrase to obtain the phrase-level text representation of the candidate entity phrase, wherein a size of a convolution kernel used for the convolutional processing is consistent with a length of a convolutional window used for constructing the candidate entity phrase.

8. The NER method according to claim 1, wherein the binary classification performed by the first classification function comprises:
obtaining a probability of corresponding to the non-named entity category and probabilities of respectively corresponding to the plurality of named entity categories; and
determining a category corresponding to a probability with a maximum value as the category to which the respective candidate entity phrase belongs.

9. The NER method according to claim 1, wherein the multi-class classification performed by the second classification function comprises:
obtaining a probability of corresponding to the non-named entity category and probabilities of respectively corresponding to the plurality of named entity categories; and
determining a category corresponding to a probability exceeding a probability threshold as the category to which the respective candidate entity phrase belongs.

10. The NER method according to claim 1, further comprising:
performing segmentation processing on the to-be-recognized text to obtain a plurality of sentences;
determining, as an abstract keyword, a candidate entity phrase of the plurality of candidate entity phrases that belongs to any named entity category and having an occurrence frequency that meets a frequency condition;
determining a score of the sentence according to a quantity of abstract keywords included in the sentence; and
determining a sentence whose score meets a score condition as a text abstract of the to-be-recognized text.

11. The NER method according to claim 1, further comprising:
determining a candidate entity phrase of the plurality of candidate entity phrases belonging to any named entity category as a keyword of a to-be-recommended object when the to-be-recognized text is used for indicating the to-be-recommended object;
obtaining a user portrait keyword and determining a keyword coincidence degree between the user portrait keyword and the keyword of the to-be-recommended object; and
performing an operation of recommending the to-be-recommended object when the keyword coincidence degree exceeds a first coincidence degree threshold.

12. The NER method according to claim 11, wherein the determining the keyword coincidence degree between the user portrait keyword and the keyword of the to-be-recommended object further comprises:
determining an intersection set between the user portrait keyword and the keyword of the to-be-recommended object and determining a first quantity of keywords included in the intersection set;
determining a union set between the user portrait keyword and the keyword of the to-be-recommended object and determining a second quantity of keywords included in the union set; and
determining a ratio of the first quantity to the second quantity as the keyword coincidence degree between the user portrait keyword and the keyword of the to-be-recommended object.

13. The NER method according to claim 1, further comprising:
determining a candidate entity phrase of the plurality of candidate entity phrases belonging to any named entity category as a keyword;
determining a keyword coincidence degree between a first to-be-recognized text and a second to-be-recognized text; and
classifying the first to-be-recognized text and the second to-be-recognized text into a same text class when the keyword coincidence degree exceeds a second coincidence degree threshold.

14. The NER method according to claim 1, further comprising:
determining a candidate entity phrase of the plurality of candidate entity phrases belonging to any named entity category as a keyword;
performing syntactic analysis processing on the to-be-recognized text to obtain a subject keyword, a relative word, and an object keyword in the to-be-recognized text, the relative word being used for indicating a relationship between the subject keyword and the object keyword; and
constructing a triplet based on the subject keyword, the relative word, and the object keyword, and adding the triplet to a knowledge graph,
wherein the knowledge graph is used for responding to an object query request comprising the subject keyword and the relative word.

15. The NER method according to claim 1, further comprising:
adding a candidate entity phrase of the plurality of candidate entity phrases belonging to any named entity category to a knowledge graph,
wherein the knowledge graph is used for responding to a category query request for the candidate entity phrase belonging to any named entity category.

16. The NER method according to claim 1, further comprising performing either of following operations to obtain the text elements in the to-be-recognized text:
using each word in the to-be-recognized text as a text element; and
performing word segmentation processing on the to-be-recognized text and using a phrase obtained through the word segmentation processing as a text element.

17. An electronic device, comprising:
a memory that stores executable instructions; and
a processor that executes the executable instructions stored in the memory to perform the artificial intelligence (AI)-based named entity recognition (NER) method according to claim 1.

18. An artificial intelligence (AI)-based named entity recognition (NER) apparatus, comprising:
processing circuitry configured to:
perform vector transformation processing on text elements in a to-be-recognized text to obtain text representations of the text elements;
construct a plurality of candidate entity phrases by generating sub-strings of the to-be-recognized text, each candidate entity phrase including a total quantity of consecutive text elements that is less than an element quantity threshold;
perform integration processing on the text representations corresponding to the text elements in each candidate entity phrase to obtain a phrase-level text representation for the respective candidate entity phrase; and perform classification processing on the phrase-level text representation of each candidate entity phrase to determine a category to which the respective candidate entity phrase belongs in a non-named entity category and a plurality of named entity categories by:
  performing fully connected processing on the phrase-level text representation of the respective candidate entity phrase; and
  using a first classification function and a second classification function, wherein both of the first classification function and the second classification function perform mapping processing on the same phrase-level text representation of the respective candidate entity phrase after the fully connected processing, the first classification function performs binary classification on the respective candidate entity phrase based on the non-named entity category and the plurality of named entity categories, and the second classification function performs multi-class classification on the respective candidate entity phrase into one of the plurality of named entity categories.

19. A non-transitory computer-readable storage medium storing instructions that, when executed by a processor, cause the processor to implement operations comprising:
  performing vector transformation processing on text elements in a to-be-recognized text to obtain text representations of the text elements;
  constructing a plurality of candidate entity phrases by generating sub-strings of the to-be-recognized text, each candidate entity phrase including a total quantity of consecutive text elements that is less than an element quantity threshold;
  performing integration processing on the text representations corresponding to the text elements in each candidate entity phrase to obtain a phrase-level text representation for the respective candidate entity phrase; and
  performing classification processing on the phrase-level text representation of each candidate entity phrase to determine a category to which the respective candidate entity phrase belongs in a non-named entity category and a plurality of named entity categories by:
    performing fully connected processing on the phrase-level text representation of the candidate entity phrase; and
    using a first classification function and a second classification function, wherein both of the first classification function and the second classification function perform mapping processing on the same phrase-level text representation of the respective candidate entity phrase after the fully connected processing, the first classification function performs binary classification on the respective candidate entity phrase based on the non-named entity category and the plurality of named entity categories, and the second classification function performs multi-class classification on the respective candidate entity phrase into one of the plurality of named entity categories.

20. The non-transitory computer-readable storage medium according to claim 19, wherein the constructing the plurality of candidate entity phrases further comprises:
  performing traversing processing on the text elements in the to-be-recognized text;
  performing a scan cycle that includes a plurality times of scan processing of a traversed text element;
  determining a scan quantity that synchronously increases or decreases based on a quantity of times that the scan processing has been performed in the scan cycle, and performing the scan processing starting from the traversed text element based on the scan quantity; and
  combining the traversed text element and a text element obtained through the scan processing into a candidate entity phrase of the plurality of candidate entity phrases until the scan quantity that is initially zero increases to a scan quantity threshold, or the scan quantity that is initially the scan quantity threshold decreases to zero, wherein the scan quantity threshold is a result obtained by subtracting one from the element quantity threshold.

* * * * *